(12) United States Patent
Huang et al.

(10) Patent No.: US 10,291,421 B2
(45) Date of Patent: May 14, 2019

(54) METHOD FOR MONITORING LICENSED-ASSISTED ACCESS CELL, DEVICE, AND BASE STATION

(71) Applicant: Huawei Technologies Co., Ltd., Shenzhen, Guangdong (CN)

(72) Inventors: Qufang Huang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/677,593

(22) Filed: Aug. 15, 2017

(65) Prior Publication Data
US 2017/0346647 A1 Nov. 30, 2017

Related U.S. Application Data

(63) Continuation of application No. PCT/CN2015/073161, filed on Feb. 16, 2015.

(51) Int. Cl.
| | |
|---|---|
| *H04W 72/04* | (2009.01) |
| *H04W 16/14* | (2009.01) |
| *H04W 74/08* | (2009.01) |
| *H04L 12/18* | (2006.01) |
| *H04W 48/16* | (2009.01) |

(52) U.S. Cl.
CPC .......... *H04L 12/189* (2013.01); *H04W 48/16* (2013.01); *H04W 72/042* (2013.01); *Y02D 70/00* (2018.01)

(58) Field of Classification Search
CPC ............. H04L 12/189; H04W 48/16; H04W 72/0453; H04W 16/14; H04W 74/0816; H04W 72/042; H04W 72/1226; H04W 84/12; Y02D 70/00

USPC .......................................................... 370/312
See application file for complete search history.

(56) References Cited

U.S. PATENT DOCUMENTS 8,897,143 B2 * 11/2014 Xu ...................... H04W 72/005
370/241
2012/0263043 A1 10/2012 Xu
(Continued)

FOREIGN PATENT DOCUMENTS

| CN | 1953573 A | 4/2007 |
|---|---|---|
| CN | 101553014 A | 10/2009 |

(Continued)

OTHER PUBLICATIONS

Huawei et al.; "Design for LAA with DL only transmissions", 3GPP TSG RAN WG1 Meeting #80; R1-150045; Athens, Greece; Feb. 9-13, 2015; 6 pages.

(Continued)

*Primary Examiner* — Edan Orgad
*Assistant Examiner* — Vanneilian Lalchinthang

(57) ABSTRACT

The present disclosure provides a method and device for monitoring a licensed-assisted access cell. The method includes user equipment receiving notification signaling from a base station, where the notification signaling is used to instruct the user equipment to monitor a target LAA cell. The user equipment monitors for a specified signal of the target LAA cell after receiving the notification signaling. In this way, user equipment does not need to continually monitor or receive a signal of an LAA cell and power consumption can be reduced.

14 Claims, 17 Drawing Sheets

(56) References Cited

U.S. PATENT DOCUMENTS

| | | | | |
|---|---|---|---|---|
| 2014/0321303 A1* | 10/2014 | Iyer | ............... | H04L 43/50 370/252 |
| 2015/0223075 A1* | 8/2015 | Bashar | ............... | H04W 16/14 370/329 |
| 2016/0095110 A1* | 3/2016 | Li | ............... | H04W 72/1215 370/329 |
| 2016/0212735 A1* | 7/2016 | Nogami | ............... | H04B 1/04 |
| 2016/0227545 A1* | 8/2016 | Yang | ............... | H04W 16/14 |
| 2016/0227578 A1* | 8/2016 | Lee | ............... | H04W 74/004 |
| 2016/0234841 A1* | 8/2016 | Pao | ............... | H04W 72/1226 |
| 2017/0280331 A1* | 9/2017 | Gou | ............... | H04L 5/0007 |

FOREIGN PATENT DOCUMENTS

| | | |
|---|---|---|
| CN | 102158807 A | 8/2011 |
| CN | 104301273 A | 1/2015 |
| WO | 2012138067 A2 | 10/2012 |
| WO | 2014137259 A1 | 9/2014 |

OTHER PUBLICATIONS

Motorola Mobility; "Activation and Deactivation of LAA SCells", 3GPP TSG-RAN WG2#89; R2-150474; Athens, Greece; Feb. 9-13, 2015; 3 pages.

Huawei et al.; "Design of DL channel reservation signal for LBE-based LAA", 3GPP TSG RAN WG1 Meeting #80; R1-150046; Athens, Greece; Feb. 9-13, 2015; 5 pages.

Huawei et al.; "Further analysis on the required functionalities for LAA", 3GPP TSG RAN WG1 Meeting #79; R1-144590; San Francisco, California, USA; Nov. 17-21, 2014; 4 pages.

Huawei et al.; "Review of existing unlicensed spectrum regulatory requirements affecting physical layer design", 3GPP TSG RAN WG1 Meeting #78bis; R1-143724; Ljubljana, Slovenia; Oct. 6-10, 2014; 8 pages.

* cited by examiner

METHOD FOR MONITORING LICENSED-ASSISTED ACCESS CELL, DEVICE, AND BASE STATION

CROSS-REFERENCE TO RELATED APPLICATIONS

This application is a continuation of International Application No. PCT/CN2015/073161, filed on Feb. 16, 2015, the disclosure of which is hereby incorporated by reference in its entirety.

TECHNICAL FIELD

Embodiments of the present application relate to the field of communications technologies, and in particular, to a method for monitoring a licensed-assisted access cell, a device, and a base station.

BACKGROUND

A rapid increase of a data volume of a mobile communications service places a strain on radio communications spectrums. In recent years, some spectrums are spared as radio television services and the like gradually exit from the market. However, the institute of electrical and electronics engineers (IEEE) does not allocate these spectrum resources to the 3rd generation partnership project (3GPP) for use. Therefore, for the 3GPP, such spectrum resources are unlicensed (unlicensed) spectrums, and are referred to as non-standard spectrums. Using an unlicensed spectrum for small cell deployment can offload data from a macro base station, thereby optimizing wireless network performance and improving user experience. If an unlicensed spectrum is used to transmit a multimedia broadcast multicast service (MBMS), the unlicensed spectrum may be effectively used, and more licensed (license) spectrums may be used for another service with a higher priority.

The unlicensed spectrum is a public spectrum but is not dedicated to the 3GPP, and any person or organization can use the spectrum to send information. Therefore, the unlicensed spectrum is not always available for the 3GPP. The 3GPP needs to contend with another system for permission to use the unlicensed spectrum. After the contention succeeds, the unlicensed spectrum can be used within a limited time but need to be released after use.

A cell using an unlicensed spectrum is referred to as a licensed-assisted access (LAA) cell. The unlicensed spectrum is not always available. Therefore, to use the LAA cell for communication, user equipment (UE) should first confirm whether the LAA cell is available. In a prior art, a base station (such as an eNB) first notifies the UE "which LAA cells may be available". After receiving the notification, the UE monitors, at any time, whether these LAA cells are available. Once the UE discovers that an LAA cell is available, the LAA cell used immediately for data transmission. However, in the prior art, the UE needs to keep monitoring these LAA cells, and consequently, power consumption of the UE is quite large.

In a prior art, the base station first notifies the UE "which LAA cells may be available". After receiving the notification, the UE keeps receiving signals of these LAA cells. When an LAA cell is available, the base station transmits data to the UE in a "cross-carrier scheduling" manner, that is, scheduling resources of the LAA cell by using a normal cell. Specifically, the base station sends, in the normal cell, downlink control information (DCI) to the UE. The DCI includes a modulation and coding scheme (MCS) of the data, an identity of the LAA cell having the data, a physical resource location of the data in the LAA cell, and the like. The UE demodulates, in the corresponding LAA cell, data according to the information. In the prior art, although the UE does not need to keep monitoring whether the LAA cell is available, the UE stills needs to keep receiving a signal of the LAA cell. Otherwise, when the normal cell notifies the UE that "the LAA cell has data", the UE has no preparation, and it is too late for the UE to receive the data of the LAA cell.

Therefore, in the prior art, UE needs to keep monitoring or receiving a signal of an LAA cell, and consequently, power consumption is quite large.

SUMMARY

Embodiments of the present disclosure provide a method for monitoring a licensed-assisted access cell, a device, and a base station, to resolve a problem that power consumption is large because it needs to keep monitoring or receiving a signal of an LAA cell.

According to a first aspect, a method for monitoring a licensed-assisted access cell is provided, where the method includes:

receiving, by user equipment, notification signaling sent by a base station, where the notification signaling is used to instruct the user equipment to monitor a target LAA cell; and monitoring, by the user equipment, a specified signal of the target LAA cell.

With reference to the first aspect, in a first possible implementation, if there are multiple LAA cells, the notification signaling includes characteristic information of the target LAA cell; and the monitoring, by the user equipment, a specified signal of the target LAA cell includes:

determining, by the user equipment, the target LAA cell from the multiple LAA cells according to the characteristic information; and monitoring, by the user equipment, the specified signal of the target LAA cell.

With reference to the first aspect or the first possible implementation of the first aspect, in a second possible implementation, the method further includes:

if the user equipment obtains the specified signal within a first preset time by means of monitoring, determining, by the user equipment, that contention for the target LAA cell succeeds and that the target LAA cell is available; or if the user equipment obtains no specified signal within a first preset time after monitoring, determining, by the user equipment, that contention for the target LAA cell fails and that the target LAA cell is unavailable.

With reference to any one of the first aspect or the foregoing possible implementations of the first aspect, in a third possible implementation, the monitoring, by the user equipment, a specified signal of the target LAA cell includes:

after a second preset time elapses from a time at which the notification signaling is received, monitoring, by the user equipment, the specified signal of the target LAA cell.

With reference to any one of the first aspect or the foregoing possible implementations of the first aspect, in a fourth possible implementation, the specified signal includes a preamble sequence; and the monitoring, by the user equipment, a specified signal of the target LAA cell includes:

monitoring, by the user equipment, the preamble sequence of the target LAA cell according to an index of the preamble sequence, where the index of the preamble sequence is obtained from the base station in advance.

With reference to the first possible implementation of the first aspect, in a fifth possible implementation, the characteristic information includes an identity of the target LAA cell or a frequency of the target LAA cell.

With reference to any one of the first aspect or the possible implementations of the first aspect, in a sixth possible implementation, the notification signaling includes broadcast signaling or dedicated signaling.

According to a second aspect, a method for monitoring a licensed-assisted access cell is provided, where the method includes:

determining, by a base station, to participate in contention for a frequency of a target LAA cell; and sending, by the base station, notification signaling to at least one user equipment, where the notification signaling is used to instruct the at least one user equipment to monitor the target LAA cell, so that the at least one user equipment monitors a specified signal of the target LAA cell.

With reference to the second aspect, in a first possible implementation, if there are multiple LAA cells, the notification signaling includes characteristic information of the target LAA cell, and is used to instruct the at least one user equipment to determine the target LAA cell from the multiple LAA cells according to the characteristic information, and monitor the specified signal of the target LAA cell.

With reference to the second aspect or the first possible implementation of the second aspect, in a second possible implementation, the specified signal includes a preamble sequence, and the method further includes:

before the at least one user equipment monitors the specified signal of the target LAA cell, notifying, by the base station, the at least one user equipment of an index of the preamble sequence, so that the at least one user equipment monitors the preamble sequence of the target LAA cell according to the index of the preamble sequence.

With reference to the first possible implementation of the second aspect, in a third possible implementation, the characteristic information includes an identity of the target LAA cell or a frequency of the target LAA cell.

With reference to any one of the second aspect or the possible implementations of the second aspect, in a fourth possible implementation, the notification signaling includes broadcast signaling or dedicated signaling.

According to a third aspect, a method for monitoring a licensed-assisted access cell is provided, where the method includes:

contending, by a base station, for a frequency of a target licensed-assisted access LAA cell;

if the base station fails in the contention for the target LAA cell, obtaining, by the base station, a usage time predicted for using the target LAA cell by a network element that succeeds in the contention for the target LAA cell; and sending, by the base station, notification signaling to at least one user equipment, where the notification signaling includes the usage time, and is used to instruct the at least one user equipment to skip monitoring the target LAA cell within the usage time.

With reference to the third aspect, in a first possible implementation, if there are multiple LAA cells, the notification signaling further includes characteristic information of the target LAA cell, and is used to instruct the at least one user equipment to determine the target LAA cell from the multiple LAA cells, and skip monitoring the target LAA cell within the usage time.

With reference to the third aspect or the first possible implementation of the third aspect, in a second possible implementation, the at least one user equipment is user equipment that is monitoring the target LAA cell.

With reference to the first possible implementation of the third aspect, in a third possible implementation, the characteristic information includes an identity of the target LAA cell or a frequency of the target LAA cell.

With reference to any one of the third aspect or the possible implementations of the third aspect, in a fourth possible implementation, the notification signaling includes broadcast signaling or dedicated signaling.

According to a fourth aspect, a method for monitoring a licensed-assisted access cell is provided, where the method includes:

receiving, by user equipment, notification signaling sent by a base station, where the notification signaling includes a usage time of a target LAA cell, and the usage time is a usage time, obtained by the base station after the base station fails in contention for the target LAA cell and from a network element that succeeds in the contention for the target LAA cell, predicted for using the target LAA cell by the network element; and skipping monitoring, by the user equipment, the target LAA cell within the usage time.

With reference to the fourth aspect, in a first possible implementation, if there are multiple LAA cells, the notification signaling further includes characteristic information of the target LAA cell, and the skipping monitoring, by the user equipment, the target LAA cell within the usage time includes:

determining, by the user equipment, the target LAA cell from the multiple LAA cells, and skipping monitoring the target LAA cell within the usage time.

With reference to the fourth aspect or the first possible implementation of the fourth aspect, in a second possible implementation, the user equipment is user equipment that is monitoring the target LAA cell.

With reference to the first possible implementation of the fourth aspect, in a third possible implementation, the characteristic information includes an identity of the target LAA cell or a frequency of the target LAA cell.

With reference to any one of the fourth aspect or the possible implementations of the fourth aspect, in a fourth possible implementation, the notification signaling includes broadcast signaling or dedicated signaling.

According to a fifth aspect, user equipment is provided, where the user equipment includes:

a receiving unit, configured to receive notification signaling sent by a base station, where the notification signaling is used to instruct the user equipment to monitor a target LAA cell; and a monitoring unit, configured to monitor a specified signal of the target LAA cell.

With reference to the fifth aspect, in a first possible implementation, if there are multiple LAA cells, the notification signaling includes characteristic information of the target LAA cell, and the monitoring unit is specifically configured to:

determine the target LAA cell from the multiple LAA cells according to the characteristic information; and monitor the specified signal of the target LAA cell.

With reference to the fifth aspect or the first possible implementation of the fifth aspect, in a second possible implementation, the user equipment further includes a determining unit, configured to:

if the specified signal is obtained within a first preset time by means of monitoring, determine that contention for the target LAA cell succeeds and that the target LAA cell is available; or if no specified signal is obtained within a first preset time after monitoring, determine that contention for the target LAA cell fails and that the target LAA cell is unavailable.

With reference to any one of the fifth aspect or the foregoing possible implementations of the fifth aspect, in a third possible implementation, the monitoring unit is specifically configured to:

after a second preset time elapses from a time at which the notification signaling is received, monitor the specified signal of the target LAA cell.

With reference to any one of the fifth aspect or the foregoing possible implementations of the fifth aspect, in a fourth possible implementation, the specified signal includes a preamble sequence, and the monitoring unit is specifically configured to:

monitor the preamble sequence of the target LAA cell according to an index of the preamble sequence, where the index of the preamble sequence is obtained from the base station in advance.

With reference to the first possible implementation of the fifth aspect, in a fifth possible implementation, the characteristic information includes an identity of the target LAA cell or a frequency of the target LAA cell.

With reference to any one of the fifth aspect or the possible implementations of the fifth aspect, in a sixth possible implementation, the notification signaling includes broadcast signaling or dedicated signaling.

According to a sixth aspect, a base station is provided, where the base station includes:

a determining unit, configured to determine to participate in contention for a frequency of a target licensed-assisted access LAA cell; and a notification unit, configured to send notification signaling to at least one user equipment, where the notification signaling is used to instruct the at least one user equipment to monitor the target LAA cell, so that the at least one user equipment monitors a specified signal of the target LAA cell.

With reference to the sixth aspect, in a first possible implementation, if there are multiple LAA cells, the notification signaling includes characteristic information of the target LAA cell, and is used to instruct the at least one user equipment to determine the target LAA cell from the multiple LAA cells according to the characteristic information, and monitor the specified signal of the target LAA cell.

With reference to the sixth aspect or the first possible implementation of the sixth aspect, in a second possible implementation, the specified signal includes a preamble sequence, and the notification unit is further configured to:

before the at least one user equipment monitors the specified signal of the target LAA cell, notify the at least one user equipment of an index of the preamble sequence, so that the at least one user equipment monitors the preamble sequence of the target LAA cell according to the index of the preamble sequence.

With reference to the first possible implementation of the sixth aspect, in a third possible implementation, the characteristic information includes an identity of the target LAA cell or a frequency of the target LAA cell.

With reference to any one of the sixth aspect or the possible implementations of the sixth aspect, in a fourth possible implementation, the notification signaling includes broadcast signaling or dedicated signaling.

According to a seventh aspect, a base station is provided, where the base station includes:

a contention unit, configured to contend for a frequency of a target LAA cell;

an obtaining unit, configured to: if the base station fails in the contention for the target LAA cell, obtain a usage time predicted for using the target LAA cell by a network element that succeeds in the contention for the target LAA cell; and a notification unit, configured to send notification signaling to at least one user equipment, where the notification signaling includes the usage time, and is used to instruct the at least one user equipment to skip monitoring the target LAA cell within the usage time.

With reference to the seventh aspect, in a first possible implementation, if there are multiple LAA cells, the notification signaling further includes characteristic information of the target LAA cell, and is used to instruct the at least one user equipment to determine the target LAA cell from the multiple LAA cells, and skip monitoring the target LAA cell within the usage time.

With reference to the seventh aspect or the first possible implementation of the seventh aspect, in a second possible implementation, the at least one user equipment is user equipment that is monitoring the target LAA cell.

With reference to the first possible implementation of the seventh aspect, in a third possible implementation, the characteristic information includes an identity of the target LAA cell or a frequency of the target LAA cell.

With reference to any one of the seventh aspect or the possible implementation of the seventh aspect, in a fourth possible implementation, the notification signaling includes broadcast signaling or dedicated signaling.

According to an eighth aspect, user equipment is provided, where the user equipment includes:

a receiving unit, configured to receive notification signaling sent by a base station, where the notification signaling includes a usage time of a target LAA cell, and is used to instruct to skip monitoring the target LAA cell within the usage time; and the usage time is a usage time, obtained by the base station after the base station fails in contention for the target LAA cell and from a network element that succeeds in the contention for the target LAA cell, predicted for using the target LAA cell by the network element; and a monitoring unit, configured to skip monitoring the target LAA cell within the usage time.

With reference to the eighth aspect, in a first possible implementation, if there are multiple LAA cells, the notification signaling further includes characteristic information of the target LAA cell, and the monitoring unit is specifically configured to:

determine the target LAA cell from the multiple LAA cells, and skip monitoring the target LAA cell within the usage time.

With reference to the eighth aspect or the first possible implementation of the eighth aspect, in a second possible implementation, the user equipment is user equipment that is monitoring the target LAA cell.

With reference to the first possible implementation of the eighth aspect, in a third possible implementation, the characteristic information includes an identity of the target LAA cell or a frequency of the target LAA cell.

With reference to any one of the eighth aspect or the possible implementations of the eighth aspect, in a fourth possible implementation, the notification signaling includes broadcast signaling or dedicated signaling.

The embodiments of the present disclosure provide a method for monitoring a licensed-assisted access cell, a device, and a base station. User equipment first receives notification signaling sent by a base station, where the notification signaling is used to instruct the user equipment to monitor a target LAA cell. After receiving the notification signaling, the user equipment monitors a specified signal of the target LAA cell. If there are multiple LAA cells in a normal cell served by the base station, the notification signaling further includes characteristic information of the target LAA cell. The user equipment can determine the target LAA cell from the multiple LAA cells according to the characteristic information, and monitor the specified signal of the target LAA cell. Therefore, in the embodiments of the present disclosure, monitoring is performed only when the base station gives an indication, with no need to keep monitoring or receiving a signal of an LAA cell. This can resolve a prior-art problem that power consumption is large because user equipment needs to keep monitoring or receiving a signal of an LAA cell, thereby reducing power consumption of the user equipment. Further, before monitoring the specified signal of the target LAA cell, the user equipment may obtain an index of the specified signal in advance. For example, when the specified signal is a preamble sequence, the user equipment obtains an index of the preamble sequence from the base station in advance, so that the user equipment can quickly locate a to-be-monitored preamble sequence according to the index of the preamble sequence, thereby further reducing power consumption of the user equipment.

The embodiments of the present disclosure further provide another method for monitoring a licensed-assisted access cell, a device, and a base station. After failing in contention for a frequency of a target LAA cell, a base station obtains a usage time predicted for using the target LAA cell by a network element that succeeds in the contention for the target LAA cell, and sends notification signaling to at least one user equipment. The notification signaling includes the usage time, and is used to instruct the at least one user equipment that is monitoring the target LAA cell to skip monitoring the target LAA cell within the usage time. If there are multiple LAA cells in a normal cell served by the base station, the notification signaling further includes characteristic information of the target LAA cell. The user equipment that receives the notification signaling can determine the target LAA cell from the multiple LAA cells according to the characteristic information, and skip monitoring the target LAA cell within the usage time. Therefore, in the embodiments of the present disclosure, after receiving the notification signaling from the base station, the user equipment skips monitoring the target LAA cell within the time indicated by the notification signaling. This can resolve a prior-art problem that power consumption is large because user equipment needs to keep monitoring or receiving a signal of an LAA cell, thereby reducing power consumption of the user equipment.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Figure 1:
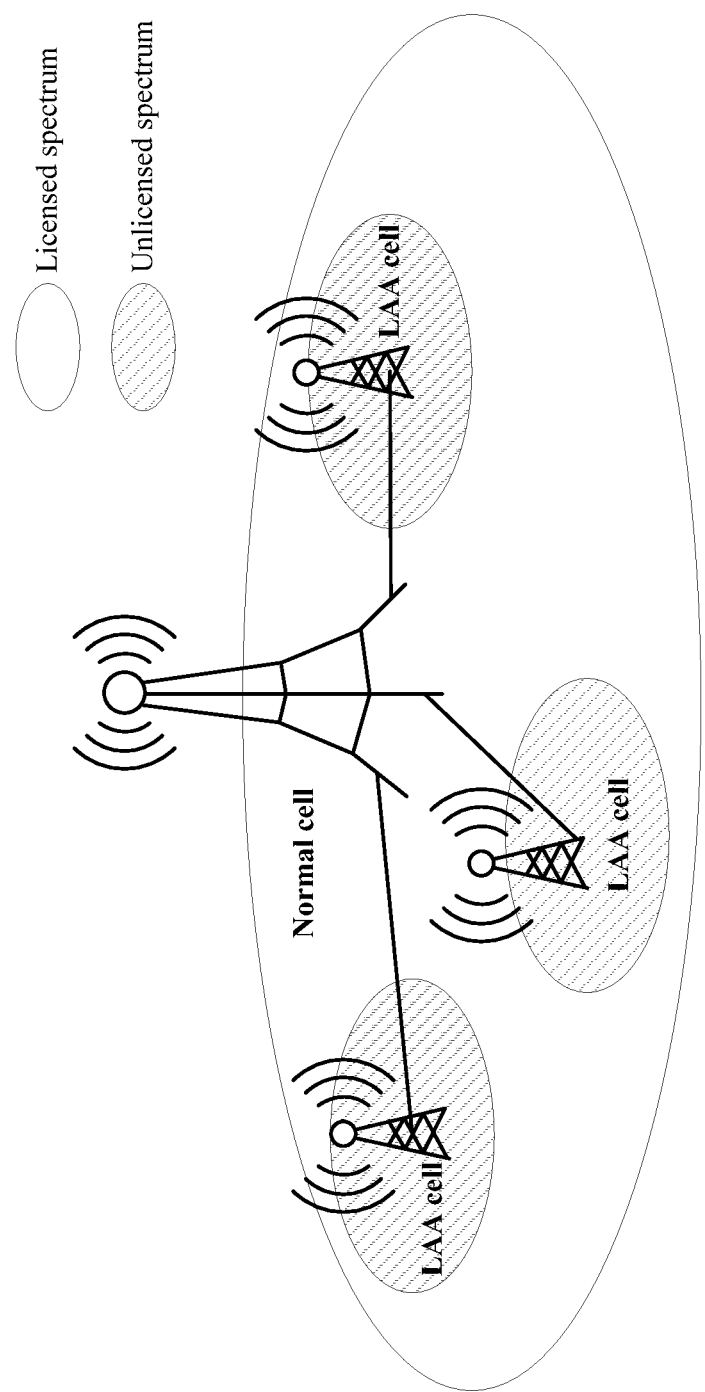
FIG. 1 is a schematic diagram of an application scenario according to an embodiment of the present disclosure.

It should be understood that the technical solutions of the embodiments may be applied to a scenario shown in FIG. 1. A normal cell includes multiple LAA cells. A base station serving the normal cell is a macro base station, and a base station serving an LAA cell is a small cell (also referred to as a pico cell). The normal cell uses a licensed spectrum, and the LAA cell uses an unlicensed spectrum. The base station serving the normal cell can perform data transmission with user equipment by using the LAA cell, thereby offloading data from the base station serving the normal cell, and optimizing wireless network performance.

Figure 2:
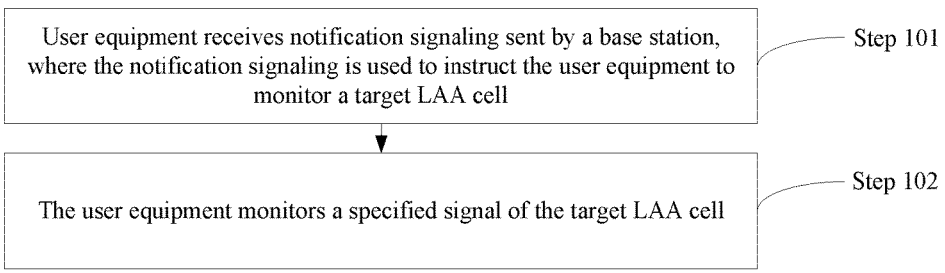
FIG. 2 is a schematic flowchart of a method for monitoring a licensed-assisted access cell according to an embodiment of the present disclosure.

An embodiment of the present disclosure provides a method for monitoring a licensed-assisted access cell, and the method is executed by user equipment. As shown in FIG. 2, the method includes the following steps.

Step 101: The user equipment receives notification signaling sent by a base station, where the notification signaling is used to instruct the user equipment to monitor a target LAA cell.

Step 102: The user equipment monitors a specified signal of the target LAA cell.

When only one LAA cell is configured, the notification signaling from the base station is sufficient. When there are multiple LAA cells, the notification signaling sent by the base station further includes characteristic information of the target LAA cell. The user equipment first determines the target LAA cell from the multiple LAA cells according to the characteristic information, and then monitors the specified signal of the target LAA cell.

Figure 3:
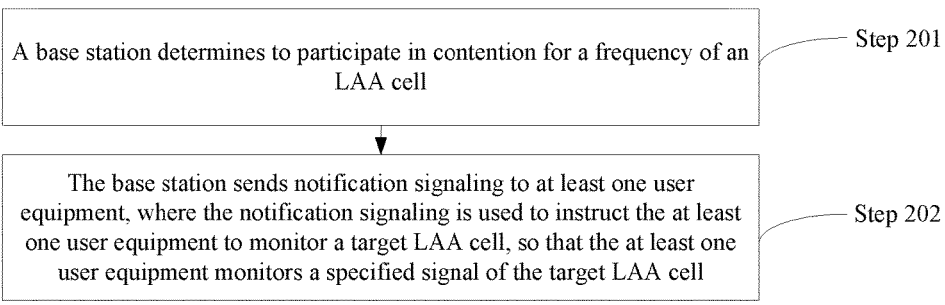
FIG. 3 is a schematic flowchart of another method for monitoring a licensed-assisted access cell according to an embodiment of the present disclosure.

Correspondingly, an embodiment of the present disclosure further provides another method for monitoring a licensed-assisted access cell. The method is executed by a base station, and the base station is a base station serving a normal cell. As shown in FIG. 3, the method includes the following steps.

Step 201: The base station determines to participate in contention for a frequency of an LAA cell.

Step 202: The base station sends notification signaling to at least one user equipment, where the notification signaling is used to instruct the at least one user equipment to monitor a target LAA cell, so that the at least one user equipment monitors a specified signal of the target LAA cell.

When only one LAA cell is configured, the notification signaling from the base station is sufficient. When there are multiple LAA cells, the notification signaling sent by the base station further includes characteristic information of the target LAA cell, so that the user equipment first determines the target LAA cell from the multiple LAA cells according to the characteristic information, and then monitors the specified signal of the target LAA cell.

Figure 4:
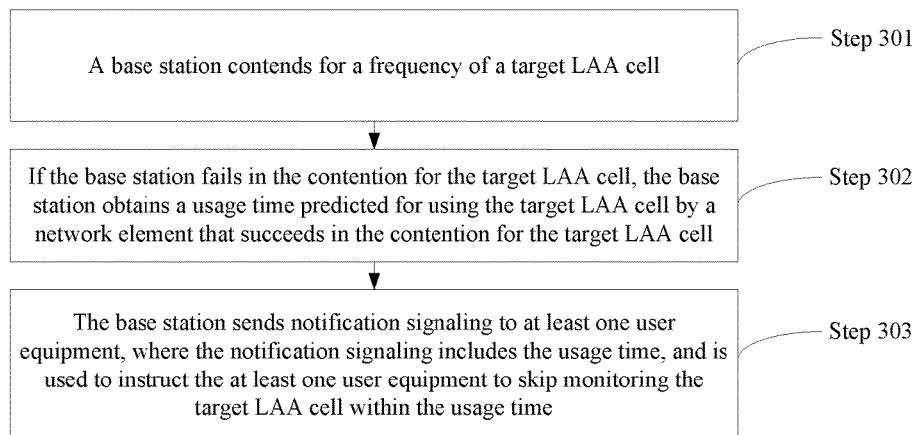
FIG. 4 is a schematic flowchart of another method for monitoring a licensed-assisted access cell according to an embodiment of the present disclosure.

Alternatively, in another implementation, a method for monitoring a licensed-assisted access cell according to an embodiment is executed by a base station. The base station is a base station serving a normal cell. As shown in FIG. 4, the method includes the following steps.

Step 301: The base station contends for a frequency of a target LAA cell.

Step 302: If the base station fails in the contention for the target LAA cell, the base station obtains a usage time predicted for using the target LAA cell by a network element that succeeds in the contention for the target LAA cell.

Step 303: The base station sends notification signaling to at least one user equipment, where the notification signaling includes the usage time, and is used to instruct the at least one user equipment to skip monitoring the target LAA cell within the usage time.

When only one LAA cell is configured, the notification signaling sent by the base station may not include characteristic information of the target LAA cell. When there are multiple LAA cells, the notification signaling sent by the base station further includes characteristic information of the target LAA cell, so that the at least one user equipment first determines the target LAA cell from the multiple LAA cells according to the characteristic information, and skips monitoring the target LAA cell within the usage time.

Figure 5:
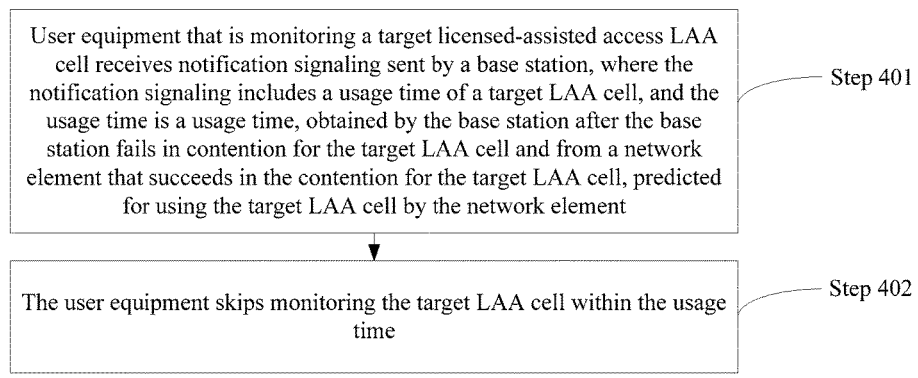
FIG. 5 is a schematic flowchart of another method for monitoring a licensed-assisted access cell according to an embodiment of the present disclosure.

Correspondingly, an embodiment further provides another method for monitoring a licensed-assisted access cell, and the method is executed by user equipment. As shown in FIG. 5, the method includes the following steps.

Step 401: The user equipment receives notification signaling sent by a base station, where the notification signaling includes a usage time of a target LAA cell, and the usage time is a usage time, obtained by the base station after the base station fails in contention for the target LAA cell and from a network element that succeeds in the contention for the target LAA cell, predicted for using the target LAA cell by the network element.

Step 402: The user equipment skips monitoring the target LAA cell within the usage time.

When only one LAA cell is configured, the notification signaling sent by the base station may not include characteristic information of the target LAA cell. When there are multiple LAA cells, the notification signaling sent by the base station further includes characteristic information of the target LAA cell. The at least one user equipment determines the target LAA cell from the multiple LAA cells according to the characteristic information, and skips monitoring the target LAA cell within the usage time.

In addition, the target LAA cell in this embodiment of the present disclosure may be one or more LAA cells in a normal cell.

Figure 6:
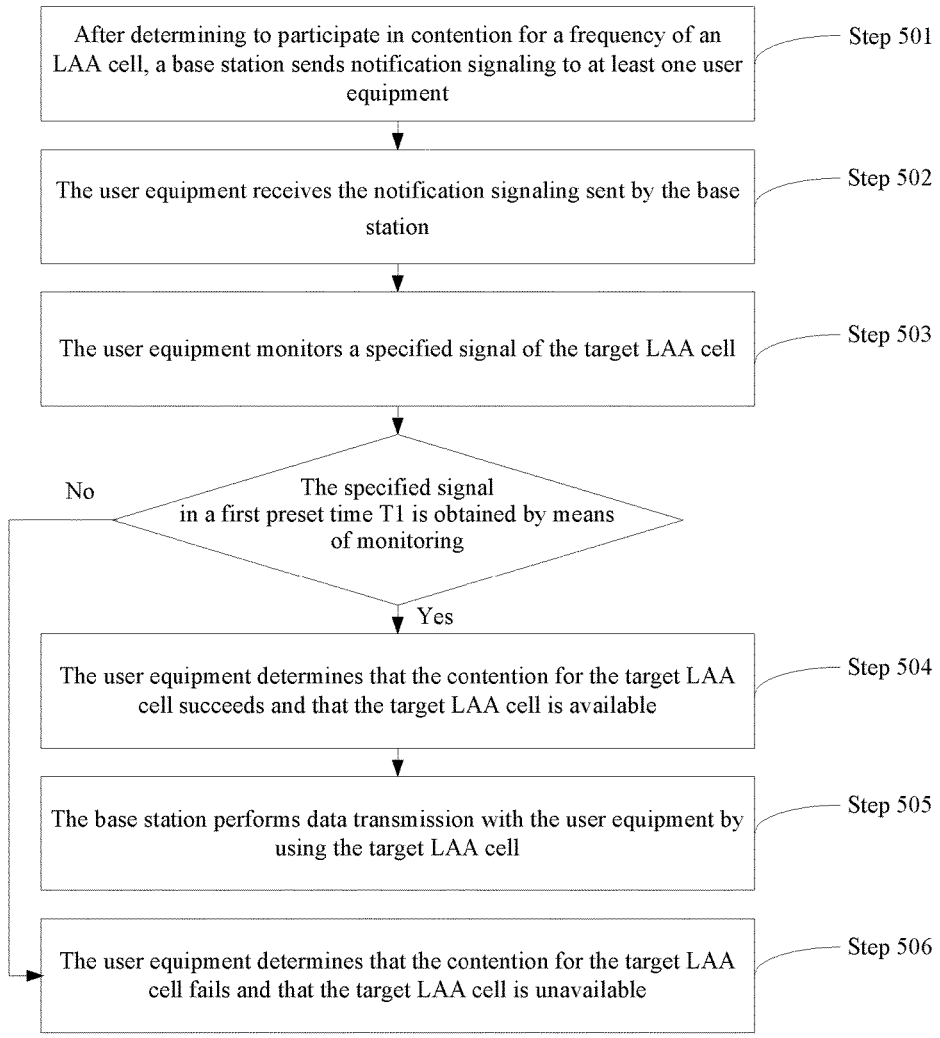
FIG. 6 is a schematic flowchart of another method for monitoring a licensed-assisted access cell according to an embodiment of the present disclosure.

To make persons skilled in the art understand the technical solutions provided in the embodiments of the present disclosure more clearly, the following describes in detail, by using specific embodiments, a method for monitoring a licensed-assisted access cell according to an embodiment of the present disclosure. As shown in FIG. 6, the method includes the following steps.

Step 501: After determining to participate in contention for a frequency of an LAA cell, a base station sends notification signaling to at least one user equipment.

The notification signaling is used to notify the user equipment that the base station is to participate in the contention for a frequency of the LAA cell, and instruct the user equipment to monitor a target LAA cell. If only one LAA cell is configured in a normal cell served by the base station, the notification signaling does not need to carry other information. After receiving the notification signaling, the user equipment monitors only this LAA cell by default. When there are multiple LAA cells, the notification signaling includes characteristic information of the target LAA cell (that is, the characteristic information of the target LAA cell that the base station is to contend for). The target LAA cell may be one or more LAA cells. The characteristic information may include identities (for example, IDs) or frequencies of these target LAA cells. The characteristic information is used by the user equipment to determine which LAA cells are the target LAA cells.

Optionally, the notification signaling may be broadcast signaling or may be dedicated signaling. If the notification signaling is dedicated signaling, the base station needs to choose to notify some user equipments. However, because only some user equipments are notified, after the base station succeeds in the contention, the base station can perform data transmission only with the user equipments by using an LAA cell obtained through contention. Certainly, such a restriction is valid only after the current contention succeeds, and the restriction is invalid after next contention succeeds. If the notification signaling is broadcast signaling, the base station may perform data transmission with any user equipment after the contention succeeds.

Step 502: The user equipment receives the notification signaling sent by the base station.

Step 503: The user equipment monitors a specified signal of the target LAA cell.

Specifically, for example, when there are multiple LAA cells, the notification signaling includes characteristic information of the target LAA cell. After receiving the notification signaling, the user equipment first finds the corresponding LAA cell according to the characteristic information in the notification signaling, such as an identity of the target LAA cell or a frequency of the target LAA cell, and then monitors specified signal of the LAA cell.

If the specified signal is obtained within a first preset time T1 by means of monitoring, steps 504 and 505 are performed. If no specified signal is obtained within a first preset time T1 after monitoring, step 506 is performed.

For example, the specified signal may be a preamble (preamble) sequence. It should be noted that, if a receiving party does not know beforehand which preamble sequence is to be sent by a sending party, the receiving party determines, only by means of blind detection, whether a signal is sent and which preamble sequence is sent. This leads to highly complex processing. Therefore, to avoid blind detection to reduce processing complexity and increase a speed at which the UE user equipment monitors the target LAA cell, the base station may notify in advance the user equipment of an index that is of the preamble sequence and that is to be sent by the base station by using the target LAA cell, where the index of the preamble sequence is used as a notification signal indicating that contention succeeds. This can reduce processing complexity, and further reduce power consumption of the user equipment.

Further, to further reduce complexity of blind detection performed by the user equipment, the preamble sequence starts only from one or more specified locations of one or more OFDM symbols.

Therefore, optionally, the notification signaling in step 501 may further include the index of the preamble sequence. In this case, after determining the target LAA cell according to the characteristic information, the user equipment may monitor the preamble sequence of the target LAA cell according to the index of the preamble sequence.

In addition, after the base station sends the notification signaling to the user equipment, because the base station may be still processing a service of the base station or because of other reasons, the base station may not participate in the contention for a frequency of the LAA cell immediately. Therefore, optionally, after receiving the notification signaling, the user equipment monitors the specified signal of the target LAA cell after a second preset time T2 elapses. For example, a monitoring process thereof may be shown in FIG. 7. A base station serving a normal cell sends the notification signaling to the user equipment, to instruct the user equipment to monitor the specified signal in the target LAA cell. After the time T2 elapses, the user equipment starts to monitor the specified signal of the target LAA cell.

Figure 7:
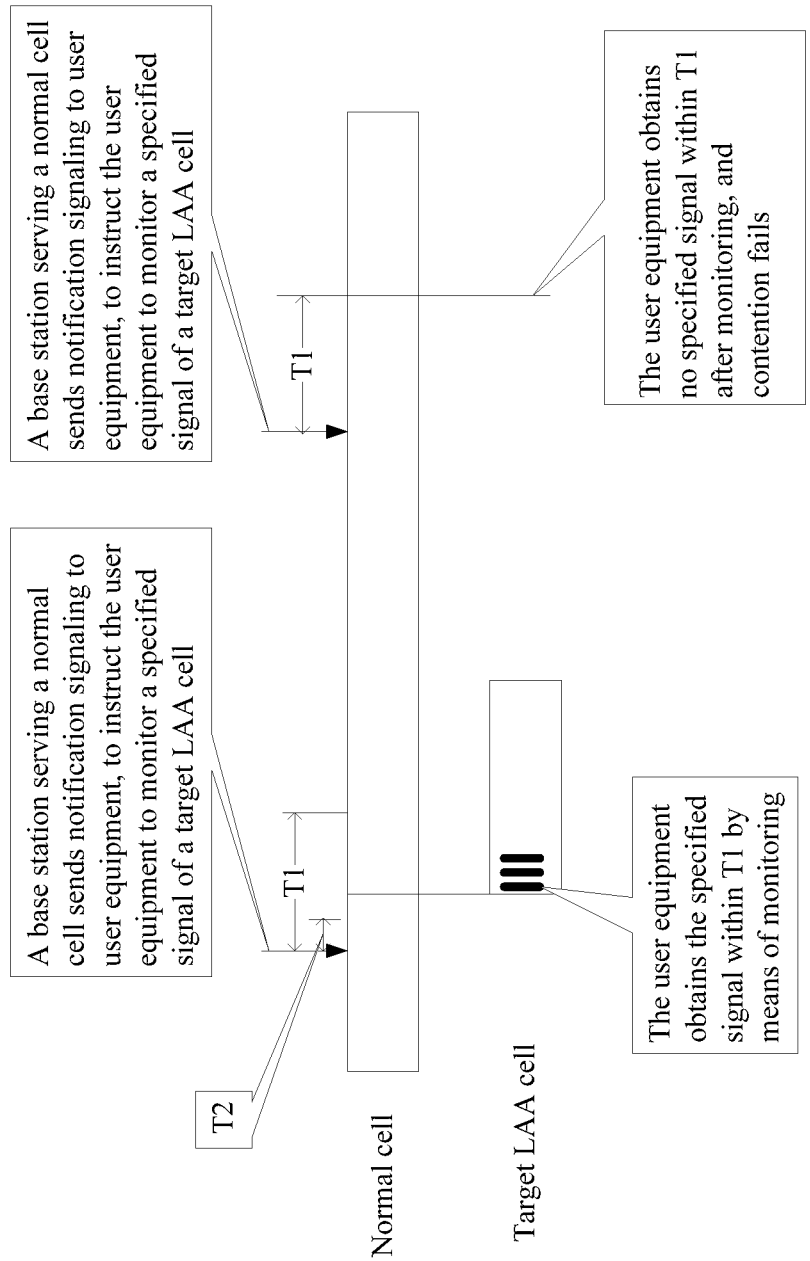
FIG. 7 is a schematic diagram of a method for monitoring a licensed-assisted access cell according to an embodiment of the present disclosure.

It can be learnt from FIG. 7 that, the user equipment obtains the specified signal within T1 by means of monitoring (which is represented by a bold black vertical line in FIG. 7), the user equipment can determine that the base station succeeds in the contention for the target LAA cell and that the target LAA cell is available. Alternatively, as shown in FIG. 7, the user equipment obtains no specified signal within T1 after monitoring, the user equipment can determine that the base station fails in the contention for the target LAA cell and that the target LAA cell is unavailable.

Step 504: The user equipment determines that contention for the target LAA cell succeeds for the target LAA cell and that the target LAA cell is available.

Step 505: The base station performs data transmission with the user equipment by using the target LAA cell.

Step 506: The user equipment determines that the base station fails in the contention for the target LAA cell and that the target LAA cell is unavailable.

This embodiment of the present disclosure provides a method for monitoring a licensed-assisted access cell. User equipment first receives notification signaling sent by a base station, where the notification signaling is used to instruct the user equipment to monitor a target LAA cell. After receiving the notification signaling, the user equipment monitors a specified signal of the target LAA cell. If there are multiple LAA cells in a normal cell served by the base station, the notification signaling further includes characteristic information of the target LAA cell. The user equipment can determine the target LAA cell from the multiple LAA cells according to the characteristic information, and monitor the specified signal of the target LAA cell. Therefore, in this embodiment of the present disclosure, monitoring is performed only when the base station gives an indication, with no need to keep monitoring or receiving a signal of an LAA cell. This can resolve a prior-art problem that power consumption is large because user equipment needs to keep monitoring or receiving a signal of an LAA cell, thereby reducing power consumption of the user equipment. Further, before monitoring the specified signal of the target LAA cell, the user equipment may obtain an index of the specified signal in advance. For example, when the specified signal is a preamble sequence, the user equipment obtains an index of the preamble sequence from the base station in advance, so that the user equipment can quickly locate a to-be-monitored preamble sequence according to the index of the preamble sequence, thereby further reducing power consumption of the user equipment.

Figure 8:
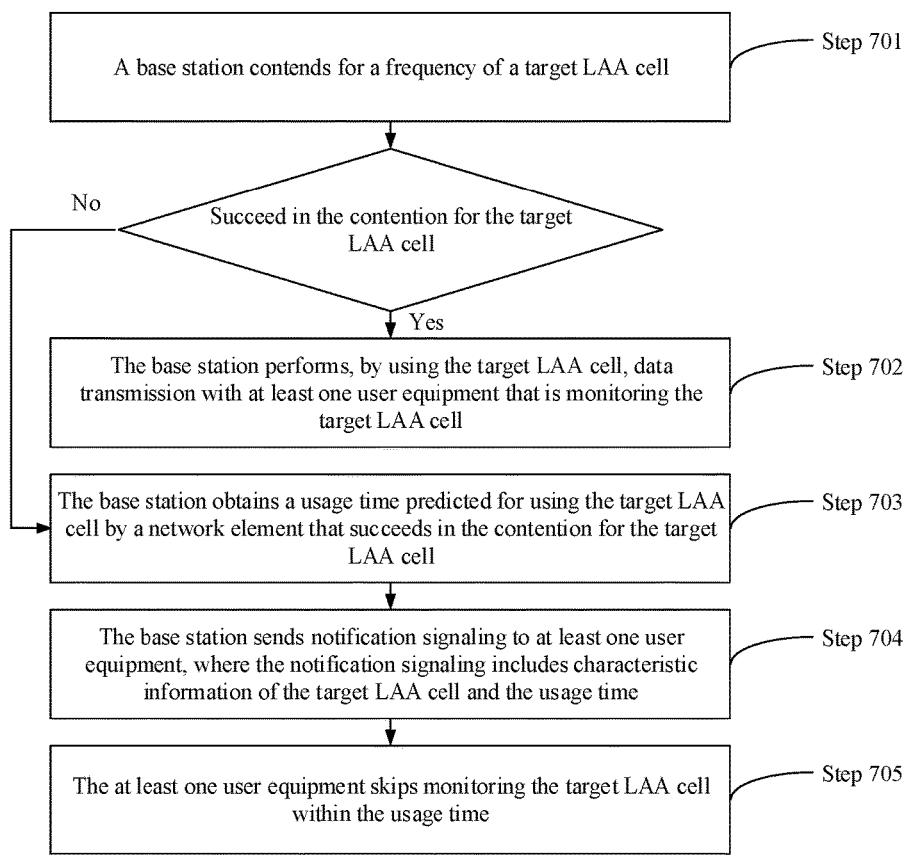
FIG. 8 is a schematic flowchart of another method for monitoring a licensed-assisted access cell according to an embodiment of the present disclosure.

In another implementation, another method for monitoring a licensed-assisted access cell is provided. As shown in FIG. 8, the method includes the following steps.

Step 701: A base station contends for a frequency of a target LAA cell.

If the base station succeeds in the contention for the target LAA cell, step 702 is performed. If the base station fails in the contention for the target LAA cell, steps 703-705 are performed.

Step 702: The base station performs data transmission with at least one user equipment by using the target LAA cell.

The at least one user equipment may be user equipment that keeps monitoring a specified signal of the target LAA cell. When the base station succeeds in the contention for the target LAA cell, the at least one user equipment receives the specified signal of the target LAA cell, so as to determine that the target LAA cell is available. Further, the base station can perform data transmission with the at least one user equipment by using the target LAA cell. For the specified signal, reference may be made to the specified signal in step 503, and details are not further described herein.

Step 703: The base station obtains a usage time predicted for using the target LAA cell by a network element that succeeds in the contention for the target LAA cell.

Step 704: The base station sends notification signaling to at least one user equipment, where the notification signaling includes characteristic information of the target LAA cell and the usage time.

Certainly, if only one LAA cell is configured in a normal cell served by the base station, the notification signaling may not include the characteristic information of the target LAA cell.

Step 705: The at least one user equipment skips monitoring the target LAA cell within the usage time.

The at least one user equipment is user equipment that keeps monitoring the specified signal of the target LAA cell. After receiving the notification signaling, the at least one user equipment skips monitoring the target LAA cell within the usage time according to the usage time in the notification signaling. Alternatively, the at least one user equipment does not keep monitoring the target LAA cell, but monitors the target LAA cell only after the base station performs instructing or in another case in which monitoring is required. During monitoring, the user equipment skips monitoring the target LAA cell within the usage time according to the usage time received previously.

Figure 9:
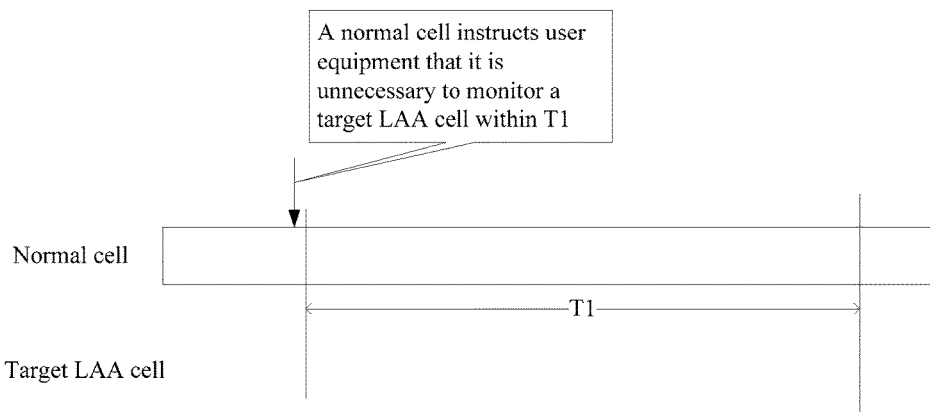
FIG. 9 is another schematic diagram of a method for monitoring a licensed-assisted access cell according to an embodiment of the present disclosure.

A monitoring process thereof may be shown in FIG. 9. That the user equipment keeps monitoring the target LAA cell is used as an example. After receiving the notification signaling, the user equipment obtains, from the notification signaling, a time T1 during which monitoring the target LAA cell is not required, and stops monitoring the target LAA cell within T1.

This embodiment of the present disclosure further provides another method for monitoring a licensed-assisted access cell. After failing in contention for a frequency of a target LAA cell, a base station obtains a usage time predicted for using the target LAA cell by a network element that succeeds in the contention for the target LAA cell, and sends notification signaling to at least one user equipment. The notification signaling includes the usage time, and is used to instruct the at least one user equipment that is monitoring the target LAA cell to skip monitoring the target LAA cell within the usage time. If there are multiple LAA cells in a normal cell served by the base station, the notification signaling further includes characteristic information of the target LAA cell. The user equipment that receives the notification signaling can determine the target LAA cell from the multiple LAA cells according to the characteristic information, and skip monitoring the target LAA cell within the usage time. Therefore, in this embodiment of the present disclosure, after receiving the notification signaling from the base station, the user equipment skips monitoring the target LAA cell within the time indicated by the notification signaling. This can resolve a prior-art problem that power consumption is large because user equipment needs to keep monitoring or receiving a signal of an LAA cell, thereby reducing power consumption of the user equipment.

Figure 10:
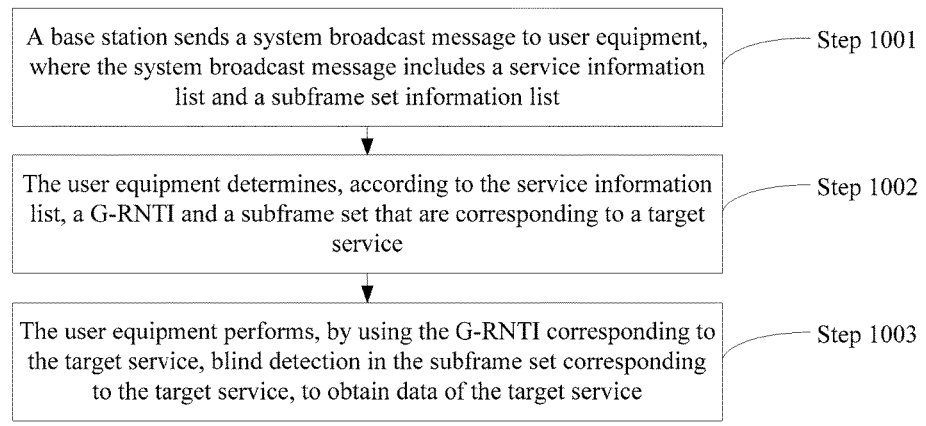
FIG. 10 is a schematic flowchart of a method for reading broadcast service data according to an embodiment of the present disclosure.

In addition, an embodiment of the present disclosure further provides a method for reading broadcast service data. As shown in FIG. 10, the method includes the following steps.

Step 1001: A base station sends a system broadcast message to user equipment, where the system broadcast message includes a service information list and a subframe set information list.

The service information list includes information about one or more services. Information about each service includes a group-radio network temporary identifier (G-RNTI) corresponding to the service, and a subframe set corresponding to the service. The subframe set corresponding to the service may be construed as a set of possible subframes in which the service is distributed.

The subframe set information list includes information about one or more multiple subframe sets. Information about each subframe set includes a radio frame period, an offset, and a bitmap of the subframe set. The radio frame period and the offset are used to indicate a radio frame in which the subframe set exists. The bitmap is used to indicate which subframes in the radio frame are subframes in the subframe set.

Step 1002: The user equipment determines, according to the service information list, a G-RNTI and a subframe set that are corresponding to a target service.

Step 1003: The user equipment performs, by using the G-RNTI corresponding to the target service, blind detection in the subframe set corresponding to the target service, to obtain data of the target service.

For example, assuming that the target service of the user equipment is a service A, the service information list and the subframe set information list that are in the system broadcast message received by the user equipment from the base station are shown in Table 1 and Table 2, respectively.

TABLE 1

| Service | G-RNTI | Subframe set |
| --- | --- | --- |
| Service A | G-RNTI A | Subframe set 1 |
| Sendee B | G-RNTI B | Subframe set 2 |

TABLE 2

| Subframe set | Period (radio frame) | Offset (radio frame) | Bitmap |
| --- | --- | --- | --- |
| Subframe set 1 | 4 | 0 | 0110001100 |
| Subframe set 2 | 8 | 1 | 0110001000 |

According to Table 1, the user equipment can determine the target service of the user equipment. That is, a G-RNTI corresponding to the service A is the G-RNTI A, and the corresponding subframe set is the subframe set 1. According to Table 2, it can be learnt that a period of radio frames in which subframes in the subframe set 1 exist is 4, and an offset is 0. Therefore, the radio frames in which the subframes in the subframe set 1 exist are radio frames 0, 4, 8, 12, 16, . . . . According to the bitmap 0110001100, it can be learnt that the subframes in the subframe set 1 are subframes 1, 2, 6, and 7 in the radio frames 0, 4, 8, 12, 16, . . . . The user equipment can obtain data of the service A by using G-RNTI A to perform blind detection in the subframes 1, 2, 6, and 7 in the radio frames 0, 4, 8, 12, 16, . . . .

Figure 11:
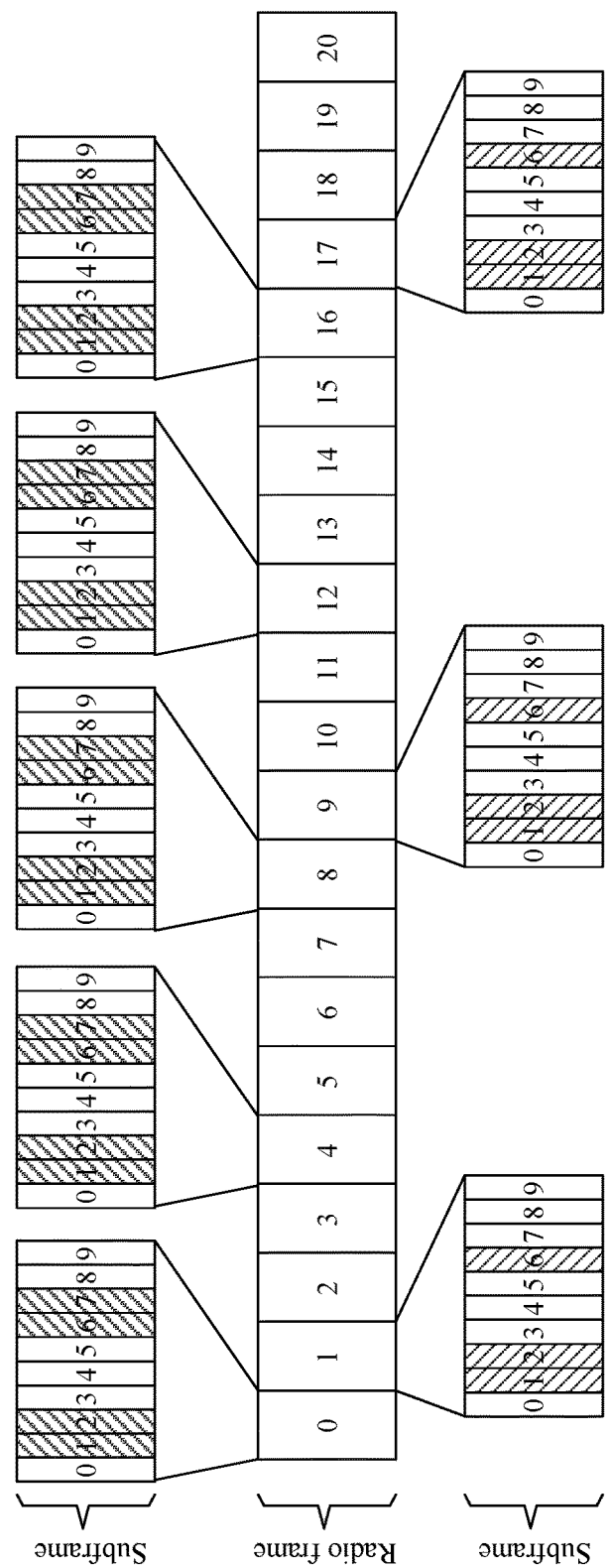
FIG. 11 is a schematic structural diagram of a subframe structure used in a method for reading broadcast service data according to an embodiment of the present disclosure.

FIG. 11 is a structural diagram of radio frames. As shown in FIG. 11, each radio frame of radio frames 0 to 19 includes 10 subframes, that is, subframes 0 to 9. A subframe set 1 includes subframes 1, 2, 6, and 7 (which are represented by slashes) in the radio frames 0, 4, 8, 12, 16, . . . . A subframe set 2 includes subframes 1, 2, and 6 (which are represented by slashes whose directions are reverse to the slashes representing the subframes in the subframe set 1) in radio frames 1, 9, 17, . . . .

It can be learnt that in this embodiment, a service may be limited to a definite subframe set, and the user equipment can read service data by detecting only some subframes. This can reduce power consumption of the user equipment. In addition, the foregoing parameters are merely examples, including but without being limited thereto. The foregoing service may be a multimedia broadcast multicast service (MBMS), and the subframe may be a multimedia broadcast multicast service single frequency network (MBSFN) subframe.

Figure 12:
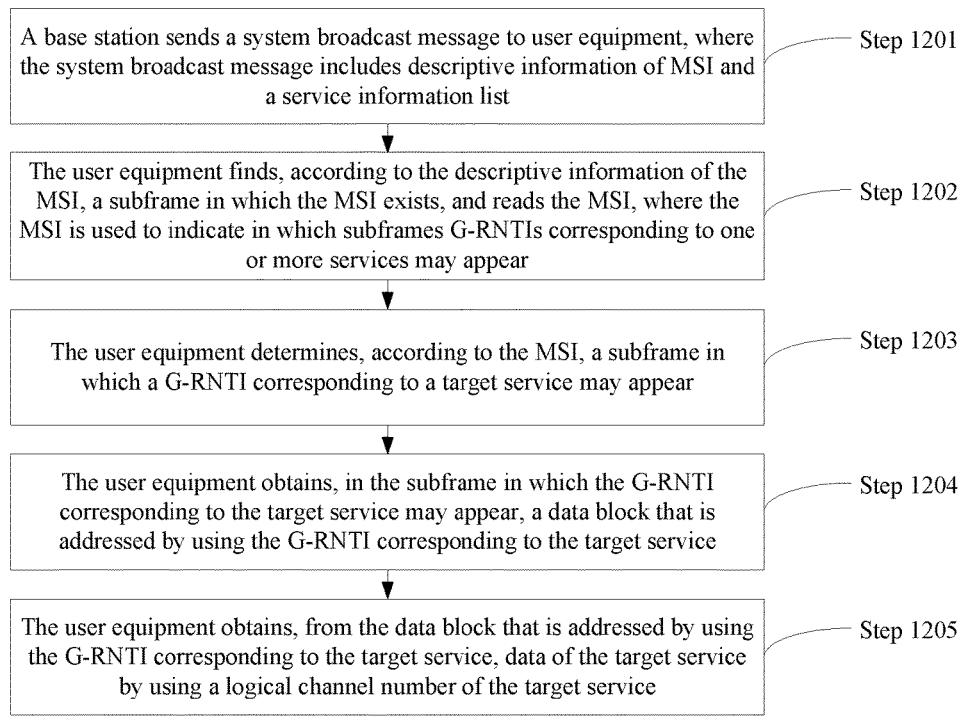
FIG. 12 is a schematic flowchart of another method for reading broadcast service data according to an embodiment of the present disclosure.

Alternatively, an embodiment of the present disclosure further provides another method for reading broadcast service data. As shown in FIG. 12, the method includes the following steps.

Step 1201: A base station sends a system broadcast message to user equipment, where the system broadcast message includes descriptive information of MBMS scheduling information (MSI) and a service information list.

The descriptive information of the MSI includes a radio frame period of the MSI, an offset, and a number of a subframe in which the MSI exists, or other information that the UE can use to find a subframe in which the MSI exists. The service information list includes information about one or more services, and information about each service includes a G-RNTI and a logical channel number of the service.

Step 1202: The user equipment finds, according to the descriptive information of the MSI, a subframe in which the MSI exists, and reads the MSI, where the MSI is used to indicate in which subframes G-RNTIs corresponding to one or more services may appear.

Step 1203: The user equipment determines, according to the MSI, a subframe in which a G-RNTI corresponding to a target service may appear.

Step 1204: The user equipment obtains, in the subframe in which the G-RNTI corresponding to the target service may appear, a data block that is addressed by using the G-RNTI corresponding to the target service.

Step 1205: The user equipment obtains, from the data block that is addressed by using the G-RNTI corresponding to the target service, data of the target service by using a logical channel number of the target service.

For example, assuming that the target service of the user equipment is a service B, the descriptive information of the MSI and the service information list that are in the system broadcast message received by the user equipment from the base station are shown in Table 3 and Table 4, respectively.

TABLE 3

| Descriptive information of MSI | Period (radio frame) | Offset | Number of a subframe |
|---|---|---|---|
| Subframe in which the MSI exists | 32 | 0 | #0 |

TABLE 4

| Service | G-RNTI | Logical channel number |
|---|---|---|
| Service A | G-RNTI A | 3 |
| Service B | G-RNTI B | 5 |
| Sendee C | G-RNTI B | 9 |

Figure 13:
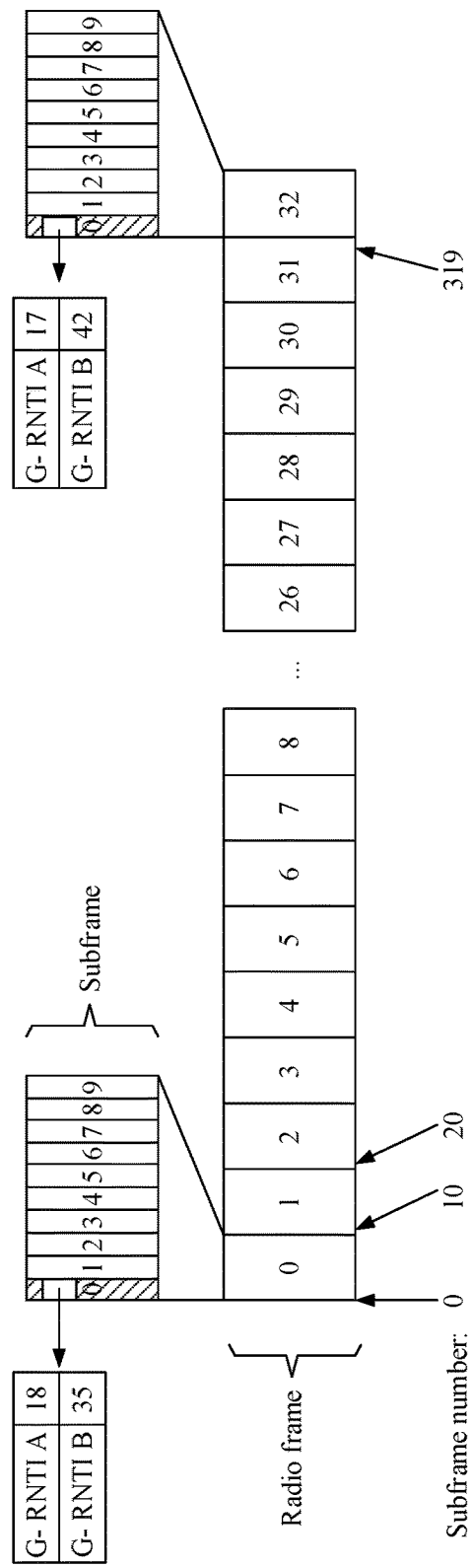
FIG. 13 is a schematic structural diagram of a subframe structure used in another method for reading broadcast service data according to an embodiment of the present disclosure.

According to information that the period of the radio frame in which the MSI exists is 32, that the offset is 0, and that the number of the subframe in which the MSI exists is #0, the user equipment may learn that the MSI exists in subframes 0 of radio frames 0, 32, 64, . . . . Then, the user equipment reads the MSI in the subframes 0 of the radio frames 0, 32, 64, . . . . For example, it is assumed that the MSI in the radio frame 0 indicates that a G-RNTI A may appear in subframes 0 to 18 and that a G-RNTI B may appear in subframes 19 to 35. As shown in FIG. 13, there are totally 32 radio frames, there are 10 subframes in each radio frame, and therefore, there are totally 320 subframes 0 to 319. A block in a subframe 0 (which is represented by slashes) represents MSI. Herein, the MSI indicates only G-RNTI A 18, indicating that the G-RNTI A may appear in the subframes 0 to 18. The MSI indicates only G-RNTI B 35, indicating that G-RNTI B may appear in the subframes 19 to 35.

The user equipment may learn the target service according to the information in Table 4. That is, a G-RNTI of the service B is the G-RNTI B, the logical channel number is 5. Therefore, the user equipment obtains, in the subframes 19 to 35 according to an MSI indication, a data block that is addressed by using the G-RNTI B. Finally, the user equipment obtains, from the data block that is addressed by using the G-RNTI B, data of the service B according to the logical channel number 5.

In addition, MSI in the radio frames 0, 32, 64, . . . may be different. For example, as shown in FIG. 13, MSI in the subframe 0 of the radio frame 32 indicates that the G-RNTI A may appear in subframes 0 to 17, and that the G-RNTI B may appear in subframes 18 to 42. Methods for reading the MSI and obtaining data of the target service by the user equipment are the same as those described above, and details are not further described.

It can be learnt that in this embodiment, a service may be limited to a definite subframe set, and the user equipment can read service data by detecting only some subframes. This can reduce power consumption of the user equipment. In addition, the foregoing parameters are merely examples, including but without being limited thereto. The foregoing service may be an MBMS service, and the subframe may be an MBSFN subframe.

Figure 14:
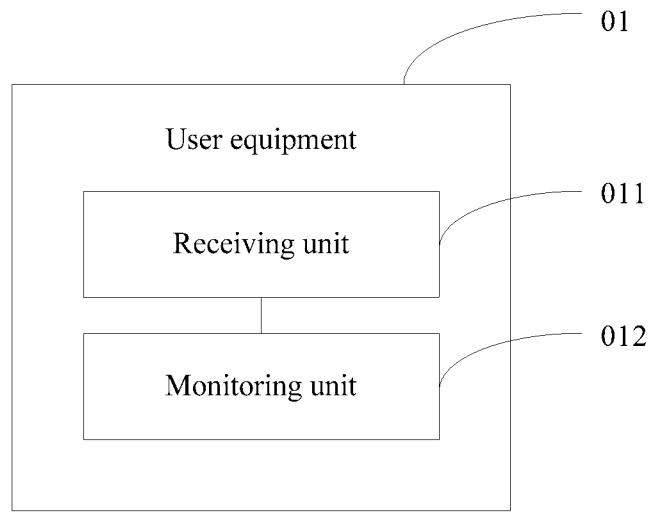
FIG. 14 is a schematic structural diagram of user equipment according to an embodiment of the present disclosure.

An embodiment of the present disclosure further provides user equipment 01. As shown in FIG. 14, the user equipment 01 includes:

a receiving unit 011, configured to receive notification signaling sent by a base station, where the notification signaling is used to instruct the user equipment to monitor a target LAA cell; and a monitoring unit 012, configured to monitor a specified signal of the target LAA cell.

Optionally, if there are multiple LAA cells, the notification signaling includes characteristic information of the target LAA cell, and the monitoring unit 012 is specifically configured to:

determine the target LAA cell from the multiple LAA cells according to the characteristic information; and monitor the specified signal of the target LAA cell.

Figure 15:
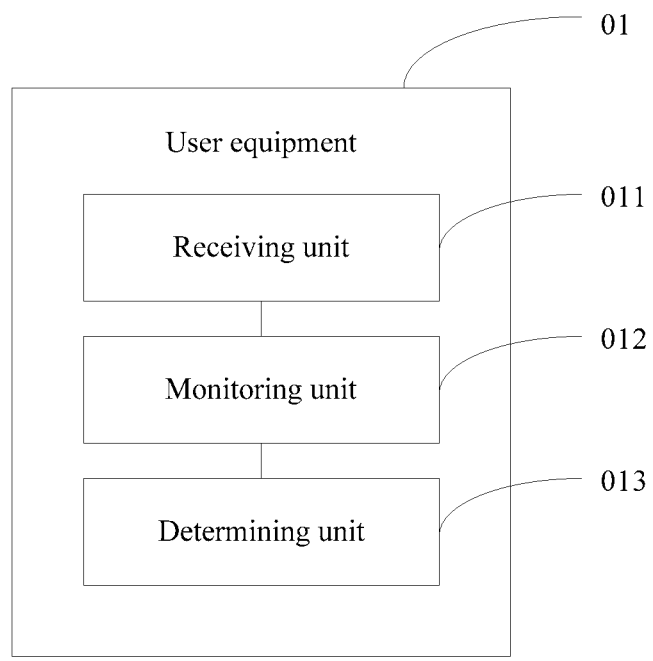
FIG. 15 is a schematic structural diagram of another user equipment according to an embodiment of the present disclosure.

Optionally, as shown in FIG. 15, the user equipment 01 further includes a determining unit 013, configured to:

if the specified signal is obtained within a first preset time by means of monitoring, determine that contention for the target LAA cell succeeds and that the target LAA cell is available; or if no specified signal is obtained within a first preset time after monitoring, determine that contention for the target LAA cell fails and that the target LAA cell is unavailable.

Optionally, the monitoring unit 012 may be specifically configured to:

after a second preset time elapses from a time at which the notification signaling is received, monitor the specified signal of the target LAA cell.

Optionally, the specified signal includes a preamble sequence, and the monitoring unit 012 may be specifically configured to:

monitor the preamble sequence of the target LAA cell according to an index of the preamble sequence.

The index of the preamble sequence is obtained from the base station in advance.

Optionally, the characteristic information includes an identity of the target LAA cell or a frequency of the target LAA cell.

Optionally, the notification signaling includes broadcast signaling or dedicated signaling.

This embodiment is used to implement the foregoing method embodiments. For the working procedures and working principles of units in this embodiment, refer to the descriptions of the foregoing method embodiments, and details are not further described herein.

This embodiment of the present disclosure provides user equipment. The user equipment receives notification signaling sent by a base station, where the notification signaling is used to instruct the user equipment to monitor a target LAA cell. After receiving the notification signaling, the user equipment monitors a specified signal of the target LAA cell. If there are multiple LAA cells in a normal cell served by the base station, the notification signaling further includes characteristic information of the target LAA cell. The user equipment can determine the target LAA cell from the multiple LAA cells according to the characteristic information, and monitor the specified signal of the target LAA cell. Therefore, in this embodiment of the present disclosure, monitoring is performed only when the base station gives an indication, with no need to keep monitoring or receiving a signal of an LAA cell. This can resolve a prior-art problem that power consumption is large because user equipment needs to keep monitoring or receiving a signal of an LAA cell, thereby reducing power consumption of the user equipment. Further, before monitoring the specified signal of the target LAA cell, the user equipment may obtain an index of the specified signal in advance. For example, when the specified signal is a preamble sequence, the user equipment obtains an index of the preamble sequence from the base station in advance, so that the user equipment can quickly locate a to-be-monitored preamble sequence according to the index of the preamble sequence, thereby further reducing power consumption of the user equipment.

Figure 16:
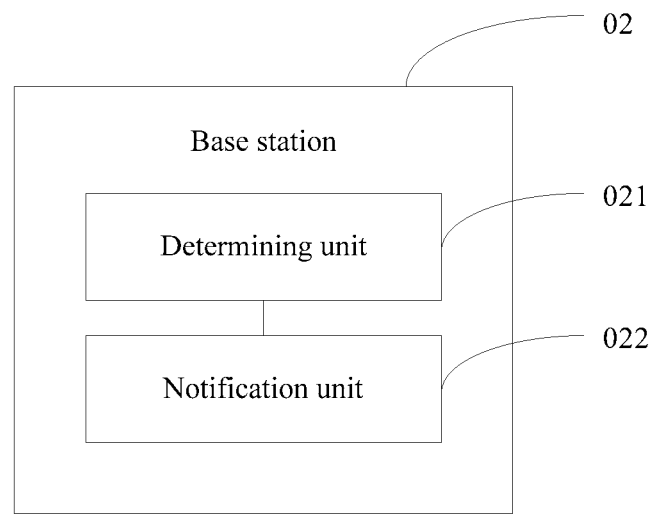
FIG. 16 is a schematic structural diagram of a base station according to an embodiment of the present disclosure.

An embodiment of the present disclosure provides a base station 02. As shown in FIG. 16, the base station 02 includes:

a determining unit 021, configured to determine to participate in contention for a frequency of a target LAA cell; and a notification unit 022, configured to send notification signaling to at least one user equipment, where the notification signaling is used to instruct the at least one user equipment to monitor the target LAA cell, and the notification signaling is used to instruct the at least one user equipment to monitor a specified signal of the target LAA cell.

Optionally, if there are multiple LAA cells, the notification signaling includes characteristic information of the target LAA cell, and is used to instruct the at least one user equipment to determine the target LAA cell from the multiple LAA cells according to the characteristic information, and monitor the specified signal of the target LAA cell.

Optionally, the specified signal includes a preamble sequence, and the notification unit 022 is further configured to:

before the at least one user equipment monitors the specified signal of the target LAA cell, notify the at least one user equipment of an index of the preamble sequence, so that the at least one user equipment monitors the preamble sequence of the target LAA cell according to the index of the preamble sequence.

Optionally, the characteristic information includes an identity of the target LAA cell or a frequency of the target LAA cell.

Optionally, the notification signaling includes broadcast signaling or dedicated signaling.

This embodiment is used to implement the foregoing method embodiments. For the working procedures and working principles of units in this embodiment, refer to the descriptions of the foregoing method embodiments, and details are not further described herein.

This embodiment of the present disclosure provides a base station. When determining to participate in contention for a frequency of an LAA cell, the base station sends notification signaling to at least one user equipment, where the notification signaling is used by the user equipment to monitor a target LAA cell. After receiving the notification signaling, the user equipment monitors specified signals of these target LAA cells. If there are multiple LAA cells in a normal cell served by the base station, the notification signaling further includes characteristic information of the target LAA cell. The user equipment can determine the target LAA cell from the multiple LAA cells according to the characteristic information, and monitor the specified signal of the target LAA cell. Therefore, in this embodiment of the present disclosure, monitoring is performed only when the base station gives an indication, with no need to keep monitoring or receiving a signal of an LAA cell. This can resolve a prior-art problem that power consumption is large because user equipment needs to keep monitoring or receiving a signal of an LAA cell, thereby reducing power consumption of the user equipment. Further, before monitoring the specified signal of the target LAA cell, the user equipment may obtain an index of the specified signal in advance. For example, when the specified signal is a preamble sequence, the base station notifies the user equipment of an index of the preamble sequence in advance, so that the user equipment can quickly locate a to-be-monitored preamble sequence according to the index of the preamble sequence, thereby further reducing power consumption of the user equipment.

Figure 17:
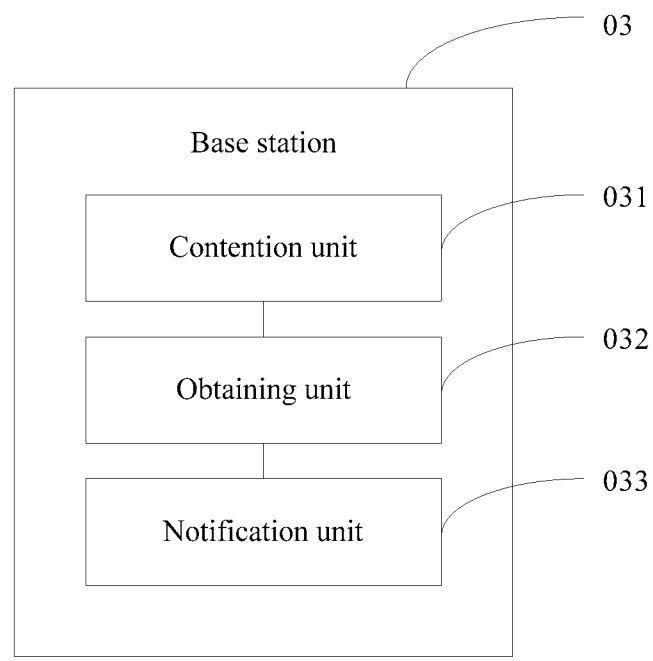
FIG. 17 is a schematic structural diagram of another base station according to an embodiment of the present disclosure.

An embodiment of the present disclosure further provides another base station 03. As shown in FIG. 17, the base station 03 includes:

a contention unit 031, configured to contend for a frequency of a target LAA cell;

an obtaining unit 032, configured to: if the base station fails in the contention for the target LAA cell, obtain a usage time predicted for using the target LAA cell by a network element that succeeds in the contention for the target LAA cell; and a notification unit 033, configured to send notification signaling to at least one user equipment, where the notification signaling includes the usage time, and is used to instruct the at least one user equipment to skip monitoring the target LAA cell within the usage time.

Optionally, if there are multiple LAA cells, the notification signaling further includes characteristic information of the target LAA cell, and is used to instruct the at least one user equipment to determine the target LAA cell from the multiple LAA cells, and skip monitoring the target LAA cell within the usage time.

Optionally, the at least one user equipment is user equipment that is monitoring the target LAA cell.

Optionally, the characteristic information includes an identity of the target LAA cell or a frequency of the target LAA cell.

Optionally, the notification signaling includes broadcast signaling or dedicated signaling.

This embodiment is used to implement the foregoing method embodiments. For the working procedures and working principles of units in this embodiment, refer to the descriptions of the foregoing method embodiments, and details are not further described herein.

This embodiment of the present disclosure provides a base station. After failing in contention for a frequency of a target LAA cell, the base station obtains a usage time predicted for using the target LAA cell by a network element that succeeds in the contention for the target LAA cell, and sends notification signaling to at least one user equipment. The notification signaling includes the usage time, and is used to instruct the at least one user equipment to skip monitoring these target LAA cells within the usage time. If there are multiple LAA cells in a normal cell served by the base station, the notification signaling further includes characteristic information of the target LAA cell. The user equipment that receives the notification signaling can determine the target LAA cell from the multiple LAA cells according to the characteristic information, and skip monitoring the target LAA cell within the usage time. Therefore, in this embodiment of the present disclosure, after receiving the notification signaling from the base station, the user equipment skips monitoring the LAA cell within the time indicated by the notification signaling. This can resolve a prior-art problem that power consumption is large because user equipment needs to keep monitoring or receiving a signal of an LAA cell, thereby reducing power consumption of the user equipment.

Figure 18:
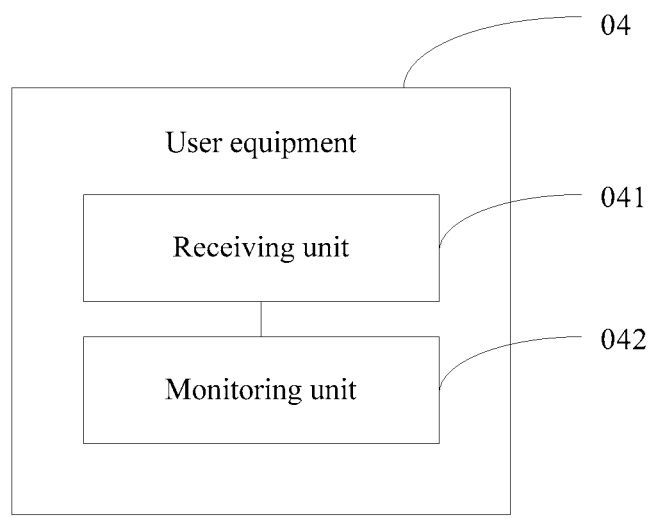
FIG. 18 is a schematic structural diagram of another user equipment according to an embodiment of the present disclosure.

An embodiment of the present disclosure further provides another user equipment 04. As shown in FIG. 18, the user equipment 04 includes:

a receiving unit 041, configured to receive notification signaling sent by a base station, where the notification signaling includes a usage time of a target LAA cell, and is used to instruct to skip monitoring the target LAA cell within the usage time; and the usage time is a usage time, obtained by the base station after the base station fails in contention for the target LAA cell and from a network element that succeeds in the contention for the target LAA cell, predicted for using the target LAA cell by the network element; and a monitoring unit 042, configured to skip monitoring the target LAA cell within the usage time.

Optionally, the at least one user equipment is user equipment that is monitoring the target LAA cell.

Optionally, if there are multiple LAA cells, the notification signaling further includes characteristic information of the target LAA cell, and the monitoring unit 042 is specifically configured to:

determine the target LAA cell from the multiple LAA cells, and skip monitoring the target LAA cell within the usage time.

Optionally, the characteristic information includes an identity of the target LAA cell or a frequency of the target LAA cell.

Optionally, the notification signaling includes broadcast signaling or dedicated signaling.

This embodiment is used to implement the foregoing method embodiments. For the working procedures and working principles of units in this embodiment, refer to the descriptions of the foregoing method embodiments, and details are not further described herein.

This embodiment of the present disclosure provides user equipment. After failing in contention for a frequency of a target LAA cell, a base station obtains a usage time predicted for using the target LAA cell by a network element that succeeds in the contention for the target LAA cell, and sends notification signaling to at least one user equipment. The notification signaling includes the usage time, and is used to instruct the at least one user equipment that is monitoring the target LAA cell to skip monitoring the target LAA cell within the usage time. If there are multiple LAA cells in a normal cell served by the base station, the notification signaling further includes characteristic information of the target LAA cell. The user equipment that receives the notification signaling can determine the target LAA cell from the multiple LAA cells according to the characteristic information, and skip monitoring the target LAA cell within the usage time. Therefore, in this embodiment of the present disclosure, after receiving the notification signaling from the base station, the user equipment skips monitoring the LAA cell within the time indicated by the notification signaling. This can resolve a prior-art problem that power consumption is large because user equipment needs to keep monitoring or receiving a signal of an LAA cell, thereby reducing power consumption of the user equipment.

Figure 19:
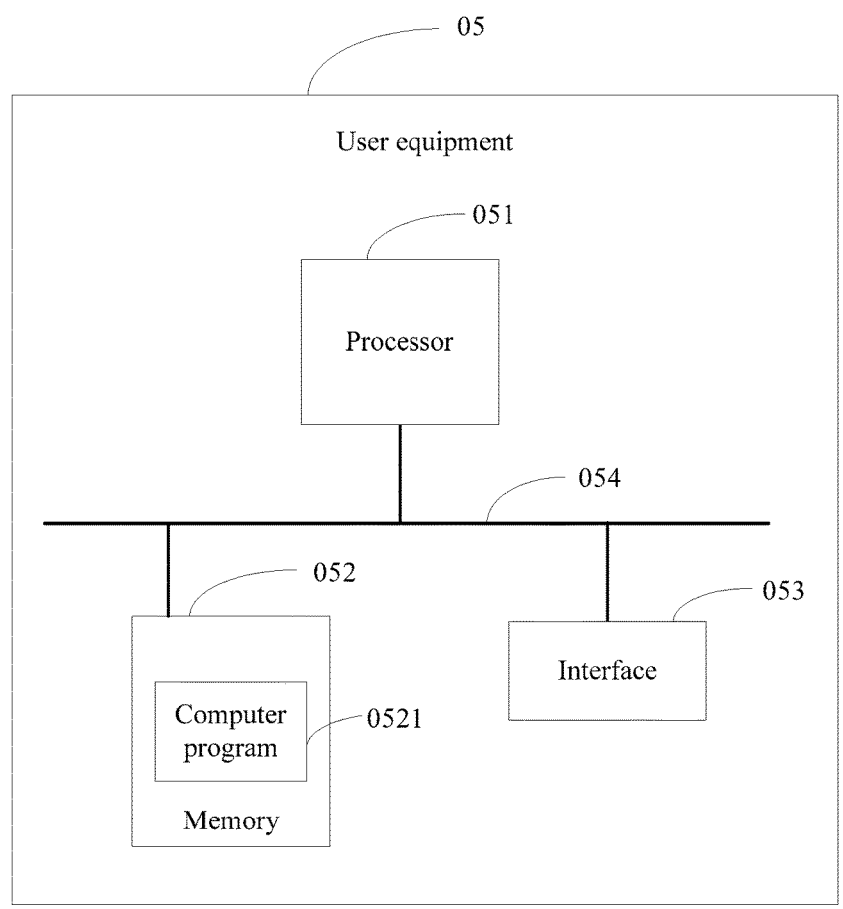
FIG. 19 is a schematic structural diagram of another user equipment according to an embodiment of the present disclosure.

An embodiment of the present disclosure provides user equipment 05. As shown in FIG. 19, the user equipment 05 includes: a processor 051, a memory 052, and an interface 053. The processor 051, the memory 052, and the interface 053 are connected by using a bus 054. The interface 053 interacts with another network element. The memory 052 is configured to store a computer program 0521. The processor 051 is configured to execute the computer program 0521. The processor 051 executes the computer program 0521 to perform the following operations:

receiving notification signaling sent by a base station, where the notification signaling is used to instruct the user equipment to monitor a target LAA cell; and monitoring a specified signal of the target LAA cell.

Optionally, if there are multiple LAA cells, the notification signaling includes characteristic information of the target LAA cell, and the processor 051 executes the computer program 0521 to perform the following operations:

determining the target LAA cell from the multiple LAA cells according to the characteristic information; and monitoring a specified signal of the target LAA cell.

Optionally, the processor 051 executes the computer program 0521 to further perform the following operation:

if the specified signal is obtained within a first preset time by means of monitoring, determining that contention for the target LAA cell succeeds and that the target LAA cell is available; or if no specified signal is obtained within a first preset time after monitoring, determining that contention for the target LAA cell fails and that the target LAA cell is unavailable.

Optionally, the processor 051 executes the computer program 0521 to specifically perform the following operation:

after a second preset time elapses from a time at which the notification signaling is received, monitoring the specified signal of the target LAA cell.

Optionally, the specified signal includes a preamble sequence, and the processor 051 executes the computer program 0521 to specifically perform the following operation:

monitoring the preamble sequence of the target LAA cell according to an index of the preamble sequence.

The index of the preamble sequence is obtained from the base station in advance.

Optionally, the characteristic information includes an identity of the target LAA cell or a frequency of the target LAA cell.

Optionally, the notification signaling includes broadcast signaling or dedicated signaling.

This embodiment is used to implement the foregoing method embodiments. For the working procedures and working principles of units in this embodiment, refer to the descriptions of the foregoing method embodiments, and details are not further described herein.

This embodiment of the present disclosure provides user equipment. The user equipment receives notification signaling sent by a base station, where the notification signaling is used to instruct the user equipment to monitor a target LAA cell. After receiving the notification signaling, the user equipment monitors a specified signal of the target LAA cell. If there are multiple LAA cells in a normal cell served by the base station, the notification signaling further includes characteristic information of the target LAA cell. The user equipment can determine the target LAA cell from the multiple LAA cells according to the characteristic information, and monitor the specified signal of the target LAA cell. Therefore, in this embodiment of the present disclosure, monitoring is performed only when the base station gives an indication, with no need to keep monitoring or receiving a signal of an LAA cell. This can resolve a prior-art problem that power consumption is large because user equipment needs to keep monitoring or receiving a signal of an LAA cell, thereby reducing power consumption of the user equipment. Further, before monitoring the specified signal of the target LAA cell, the user equipment may obtain an index of the specified signal in advance. For example, when the specified signal is a preamble sequence, the user equipment obtains an index of the preamble sequence from the base station in advance, so that the user equipment can quickly locate a to-be-monitored preamble sequence according to the index of the preamble sequence, thereby further reducing power consumption of the user equipment.

Figure 20:
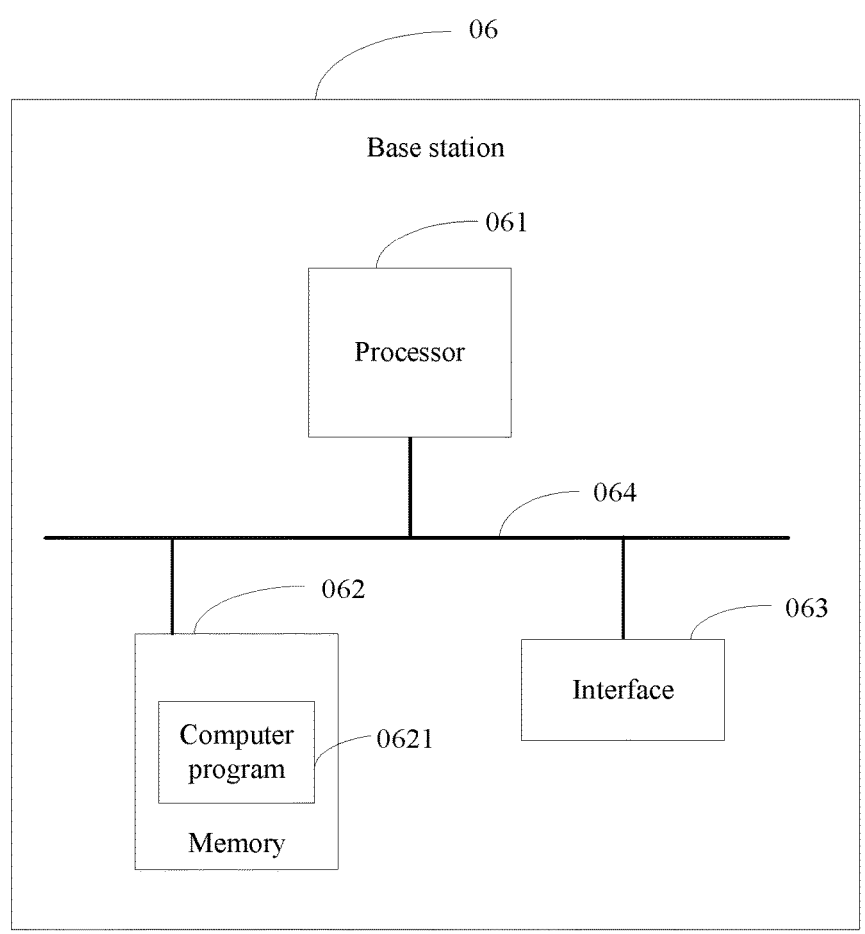
FIG. 20 is a schematic structural diagram of another base station according to an embodiment of the present disclosure.

An embodiment of the present disclosure further provides a base station 06. As shown in FIG. 20, the base station 06 includes: a processor 061, a memory 062, and an interface 063. The processor 061, the memory 062, and the interface 063 are connected by using a bus 064. The interface 063 interacts with another network element. The memory 062 is configured to store a computer program 0621. The processor 061 is configured to execute the computer program 0621. The processor 061 executes the computer program 0621 to perform the following operations:

determining that the base station is to participate in contention for a frequency of a target LAA cell; and sending notification signaling to at least one user equipment, where the notification signaling is used to instruct the at least one user equipment to monitor the target LAA cell, and the notification signaling is used to instruct the at least one user equipment to monitor a specified signal of the target LAA cell.

Optionally, if there are multiple LAA cells, the notification signaling includes characteristic information of the target LAA cell, and is used to instruct the at least one user equipment to determine the target LAA cell from the multiple LAA cells according to the characteristic information, and monitor the specified signal of the target LAA cell.

Optionally, the specified signal includes a preamble sequence, and the processor 061 executes the computer program 0621 to further perform the following operation:

before the at least one user equipment monitors the specified signal of the target LAA cell, notify the at least one user equipment of an index of the preamble sequence, so that the at least one user equipment monitors the preamble sequence of the target LAA cell according to the index of the preamble sequence.

Optionally, the characteristic information includes an identity of the target LAA cell or a frequency of the target LAA cell.

Optionally, the notification signaling includes broadcast signaling or dedicated signaling.

This embodiment is used to implement the foregoing method embodiments. For the working procedures and working principles of units in this embodiment, refer to the descriptions of the foregoing method embodiments, and details are not further described herein.

This embodiment of the present disclosure provides a base station. When determining to participate in contention for a frequency of an LAA cell, the base station sends notification signaling to at least one user equipment, where the notification signaling is used by the user equipment to monitor a target LAA cell. After receiving the notification signaling, the user equipment monitors specified signals of these target LAA cells. If there are multiple LAA cells in a normal cell served by the base station, the notification signaling further includes characteristic information of the target LAA cell. The user equipment can determine the target LAA cell from the multiple LAA cells according to the characteristic information, and monitor the specified signal of the target LAA cell. Therefore, in this embodiment of the present disclosure, monitoring is performed only when the base station gives an indication, with no need to keep monitoring or receiving a signal of an LAA cell. This can resolve a prior-art problem that power consumption is large because user equipment needs to keep monitoring or receiving a signal of an LAA cell, thereby reducing power consumption of the user equipment. Further, before monitoring the specified signal of the target LAA cell, the user equipment may obtain an index of the specified signal in advance. For example, when the specified signal is a preamble sequence, the base station notifies the user equipment of an index of the preamble sequence in advance, so that the user equipment can quickly locate a to-be-monitored preamble sequence according to the index of the preamble sequence, thereby further reducing power consumption of the user equipment.

Figure 21:
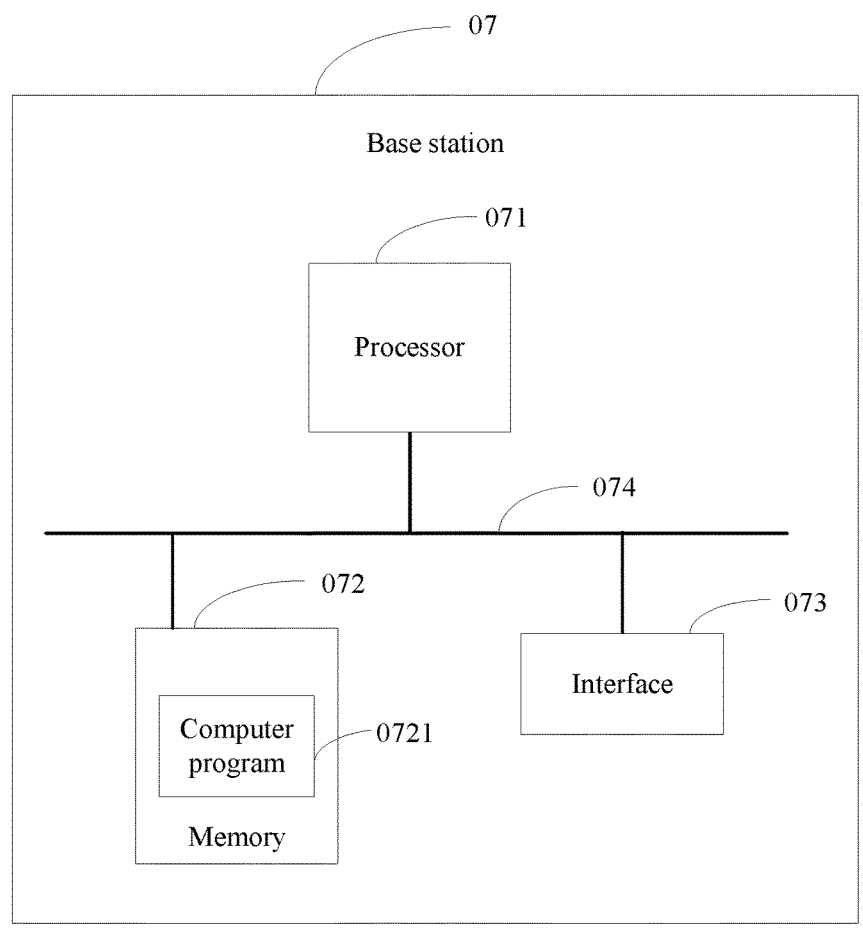
FIG. 21 is a schematic structural diagram of another base station according to an embodiment of the present disclosure.

An embodiment of the present disclosure further provides another base station 07. As shown in FIG. 21, the base station 07 includes: a processor 071, a memory 072, and an interface 073. The processor 071, the memory 072, and the interface 073 are connected by using a bus 074. The interface 073 interacts with another network element. The memory 072 is configured to store a computer program 0721. The processor 071 is configured to execute the computer program 0721. The processor 071 executes the computer program 0721 to perform the following operations:

contending for a frequency of a target LAA cell;

if the contention for the target LAA cell fails, obtaining a usage time predicted for using the target LAA cell by a network element that succeeds in the contention for the target LAA cell; and sending notification signaling to at least one user equipment, where the notification signaling includes the usage time, and is used to instruct the at least one user equipment that is monitoring the target LAA cell to skip monitoring the target LAA cell within the usage time.

Optionally, if there are multiple LAA cells, the notification signaling further includes characteristic information of the target LAA cell, and is used to instruct the at least one user equipment to determine the target LAA cell from the multiple LAA cells, and skip monitoring the target LAA cell within the usage time.

Optionally, the at least one user equipment is user equipment that is monitoring the target LAA cell.

Optionally, the characteristic information includes an identity of the target LAA cell or a frequency of the target LAA cell.

Optionally, the notification signaling includes broadcast signaling or dedicated signaling.

This embodiment is used to implement the foregoing method embodiments. For the working procedures and working principles of units in this embodiment, refer to the descriptions of the foregoing method embodiments, and details are not further described herein.

This embodiment of the present disclosure provides a base station. After failing in contention for a frequency of a target LAA cell, the base station obtains a usage time predicted for using the target LAA cell by a network element that succeeds in the contention for the target LAA cell, and sends notification signaling to at least one user equipment. The notification signaling includes the usage time, and is used to instruct the at least one user equipment to skip monitoring these target LAA cells within the usage time. If there are multiple LAA cells in a normal cell served by the base station, the notification signaling further includes characteristic information of the target LAA cell. The user equipment that receives the notification signaling can determine the target LAA cell from the multiple LAA cells according to the characteristic information, and skip monitoring the target LAA cell within the usage time. Therefore, in this embodiment of the present disclosure, after receiving the notification signaling from the base station, the user equipment skips monitoring the LAA cell within the time indicated by the notification signaling. This can resolve a prior-art problem that power consumption is large because user equipment needs to keep monitoring or receiving a signal of an LAA cell, thereby reducing power consumption of the user equipment.

Figure 22:
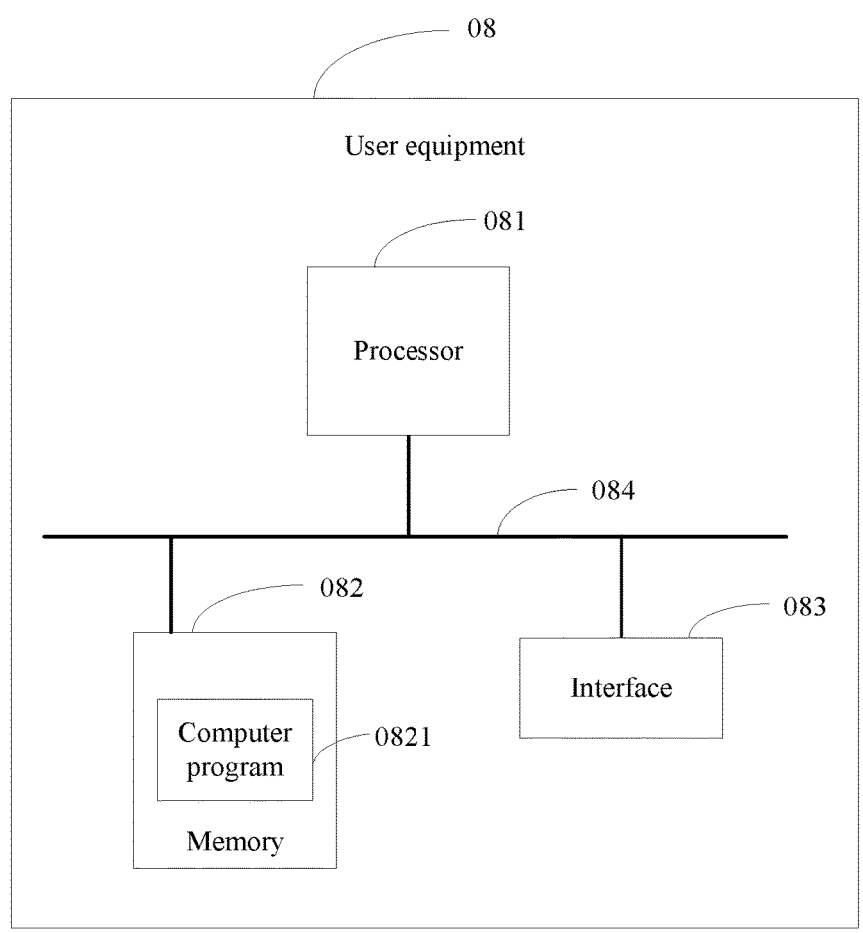
FIG. 22 is a schematic structural diagram of another user equipment according to an embodiment of the present disclosure.

An embodiment of the present disclosure further provides user equipment 08. As shown in FIG. 22, the user equipment 08 is user equipment that is monitoring a target LAA cell. The user equipment 08 includes: a processor 081, a memory 082, and an interface 083. The processor 081, the memory 082, and the interface 083 are connected by using a bus 084. The interface 084 interacts with another network element. The memory 082 is configured to store a computer program 0821. The processor 081 is configured to execute the computer program 0821. The processor 081 executes the computer program 0821 to perform the following operations:

receiving notification signaling sent by a base station, where the notification signaling includes a usage time of a target LAA cell, and the usage time is a usage time, obtained by the base station after the base station fails in contention for the target LAA cell and from a network element that succeeds in the contention for the target LAA cell, predicted for using the target LAA cell by the network element; and skipping monitoring the target LAA cell within the usage time.

Optionally, if there are multiple LAA cells, the notification signaling further includes characteristic information of the target LAA cell, and the processor 081 executes the computer program 0821 to perform the following operation:

determining the target LAA cell from the multiple LAA cells, and skipping monitoring the target LAA cell within the usage time.

Optionally, the at least one user equipment is user equipment that is monitoring the target LAA cell.

Optionally, the characteristic information includes an identity of the target LAA cell or a frequency of the target LAA cell.

Optionally, the notification signaling includes broadcast signaling or dedicated signaling.

This embodiment is used to implement the foregoing method embodiments. For the working procedures and working principles of units in this embodiment, refer to the descriptions of the foregoing method embodiments, and details are not further described herein.

This embodiment of the present disclosure provides user equipment. After failing in contention for a frequency of a target LAA cell, a base station obtains a usage time predicted for using the target LAA cell by a network element that succeeds in the contention for the target LAA cell, and sends notification signaling to at least one user equipment. The notification signaling includes the usage time, and is used to instruct the at least one user equipment that is monitoring the target LAA cell to skip monitoring the target LAA cell within the usage time. If there are multiple LAA cells in a normal cell served by the base station, the notification signaling further includes characteristic information of the target LAA cell. The user equipment that receives the notification signaling can determine the target LAA cell from the multiple LAA cells according to the characteristic information, and skip monitoring the target LAA cell within the usage time. Therefore, in this embodiment of the present disclosure, after receiving the notification signaling from the base station, the user equipment skips monitoring the LAA cell within the time indicated by the notification signaling. This can resolve a prior-art problem that power consumption is large because user equipment needs to keep monitoring or receiving a signal of an LAA cell, thereby reducing power consumption of the user equipment.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electronic, mechanical, or other forms.

The units described as separate parts may or may not be physically separate. Parts displayed as units may or may not be physical units, and may be located in one position or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor (processor) to perform a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not further described herein.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for monitoring a licensed-assisted access (LAA) cell, the method comprising:
   receiving, by user equipment, notification signaling sent from a base station, wherein the notification signaling is used to instruct the user equipment to monitor the target licensed-assisted access (LAA) cell;
   obtaining, by the user equipment, an index of a preamble sequence of the target LAA cell;
   after a first preset time period elapses from a time at which the notification signaling is received, monitoring, by the user equipment, the preamble sequence of the target LAA cell within a second preset time period in accordance with the index; and
   when the preamble sequence of the target LAA cell is obtained within the second preset time period, determining, by the user equipment, that the base station succeeds in contention for the target LAA cell and that the target LAA cell is available.

2. The method according to claim 1, wherein:
   the notification signaling comprises characteristic information of the target LAA cell; and
   the method further comprises:
   determining, by the user equipment, the target LAA cell according to the characteristic information.

3. The method according to claim 2, wherein the characteristic information comprises an identity of the target LAA cell.

4. The method according to claim 2, wherein the characteristic information comprises a frequency of the target LAA cell.

5. The method according to claim 1, further comprising:
   when the user equipment does not obtain the preamble sequence within the second preset time period, determining, by the user equipment, that the target LAA cell is unavailable.

6. The method according to claim 1, wherein the notification signaling comprises broadcast signaling.

7. The method according to claim 1, wherein the notification signaling comprises dedicated signaling.

8. A user equipment, comprising:
   a processor; and
   a non-transitory computer readable storage medium storing instructions that, when executed by the processor, cause the user equipment to:
   receive notification signaling sent from a base station, wherein the notification signaling is used to instruct the user equipment to monitor a target licensed-assisted access (LAA) cell;
   obtain an index of a preamble sequence of the target LAA cell;
   after a first preset time period elapses from a time at which the notification signaling is received, monitor the preamble sequence of the target LAA cell within a second preset time period in accordance with the index; and
   when the preamble sequence of the target LAA cell is obtained within the second preset time period, determine that the base station succeeds in contention for the target LAA cell and that the target LAA cell is available.

9. The user equipment according to claim 8, wherein:
   the notification signaling comprises characteristic information of the target LAA cell; and
   the instructions, when executed by the processor, further cause the user equipment to:
   determine the target LAA cell according to the characteristic information.

10. The user equipment according to claim 9, wherein the characteristic information comprises an identity of the target LAA cell.

11. The user equipment according to claim 9, wherein the characteristic information comprises a frequency of the target LAA cell.

12. The user equipment according to claim 8, wherein the instructions, when executed by the processor, further cause the user equipment to:
    determine that the target LAA cell is unavailable when no preamble sequence is obtained within the second preset time period.

13. The user equipment according to claim 8, wherein the notification signaling comprises broadcast signaling.

14. The user equipment according to claim 8, wherein the notification signaling comprises dedicated signaling.

* * * * *